(12) United States Patent
Mizuo

(10) Patent No.: US 12,118,145 B2
(45) Date of Patent: Oct. 15, 2024

(54) ELECTRONIC APPARATUS

(71) Applicant: CANON KABUSHIKI KAISHA, Tokyo (JP)

(72) Inventor: Yoshihiro Mizuo, Tokyo (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 0 days.

(21) Appl. No.: 18/321,926

(22) Filed: May 23, 2023

(65) Prior Publication Data

US 2023/0393655 A1    Dec. 7, 2023

(30) Foreign Application Priority Data

Jun. 7, 2022   (JP) ................. 2022-092010

(51) Int. Cl.
| | | |
|---|---|---|
| G06F 3/01 | (2006.01) | |
| G02B 27/00 | (2006.01) | |
| G02B 27/01 | (2006.01) | |
| H04N 13/344 | (2018.01) | |

(52) U.S. Cl.
CPC ......... *G06F 3/013* (2013.01); *G02B 27/0093* (2013.01); *G02B 27/0172* (2013.01); *H04N 13/344* (2018.05); *G02B 2027/0178* (2013.01)

(58) Field of Classification Search
CPC . G06F 3/013; G02B 27/0093; G02B 27/0172; G02B 2027/0178; H04N 13/327
See application file for complete search history.

(56) References Cited

U.S. PATENT DOCUMENTS

| | | | |
|---|---|---|---|
| 2015/0213648 A1* | 7/2015 | Wu | G06T 7/85 |
| | | | 345/419 |
| 2017/0099482 A1* | 4/2017 | Fateh | G02B 27/0172 |
| 2019/0108383 A1* | 4/2019 | Klingström | G06T 7/74 |
| 2019/0156150 A1* | 5/2019 | Krishnan | G06V 40/70 |
| 2019/0272028 A1* | 9/2019 | Hong | G06F 1/163 |
| 2019/0369718 A1* | 12/2019 | Wei | H04N 13/344 |
| 2020/0100668 A1* | 4/2020 | Higashikawa | A61B 3/0041 |
| 2021/0097644 A1* | 4/2021 | Sommerlade | G06T 5/73 |
| 2021/0176555 A1* | 6/2021 | Hoffmann | H03G 5/165 |

FOREIGN PATENT DOCUMENTS

| | | |
|---|---|---|
| JP | 2021-051180 A | 4/2021 |
| WO | 2019/021601 A1 | 1/2019 |

* cited by examiner

*Primary Examiner* — Ryan A Lubit
(74) *Attorney, Agent, or Firm* — Cowan, Liebowitz & Latman, P.C.

(57) ABSTRACT

An electronic apparatus according to the present invention, includes at least one memory and at least one processor which function as: a first acquisition unit configured to acquire right line-of-sight information on a line-of-sight of a right eye of a user; a second acquisition unit configured to acquire left line-of-sight information on a line-of-sight of a left eye of the user; and a control unit configured to control such that right eye calibration is performed on a basis of right line-of-sight information which is acquired by the first acquisition unit at a first timing, and left eye calibration is performed on a basis of left line-of-sight information which is acquired by the second acquisition unit at a second timing which is different from the first timing.

18 Claims, 16 Drawing Sheets

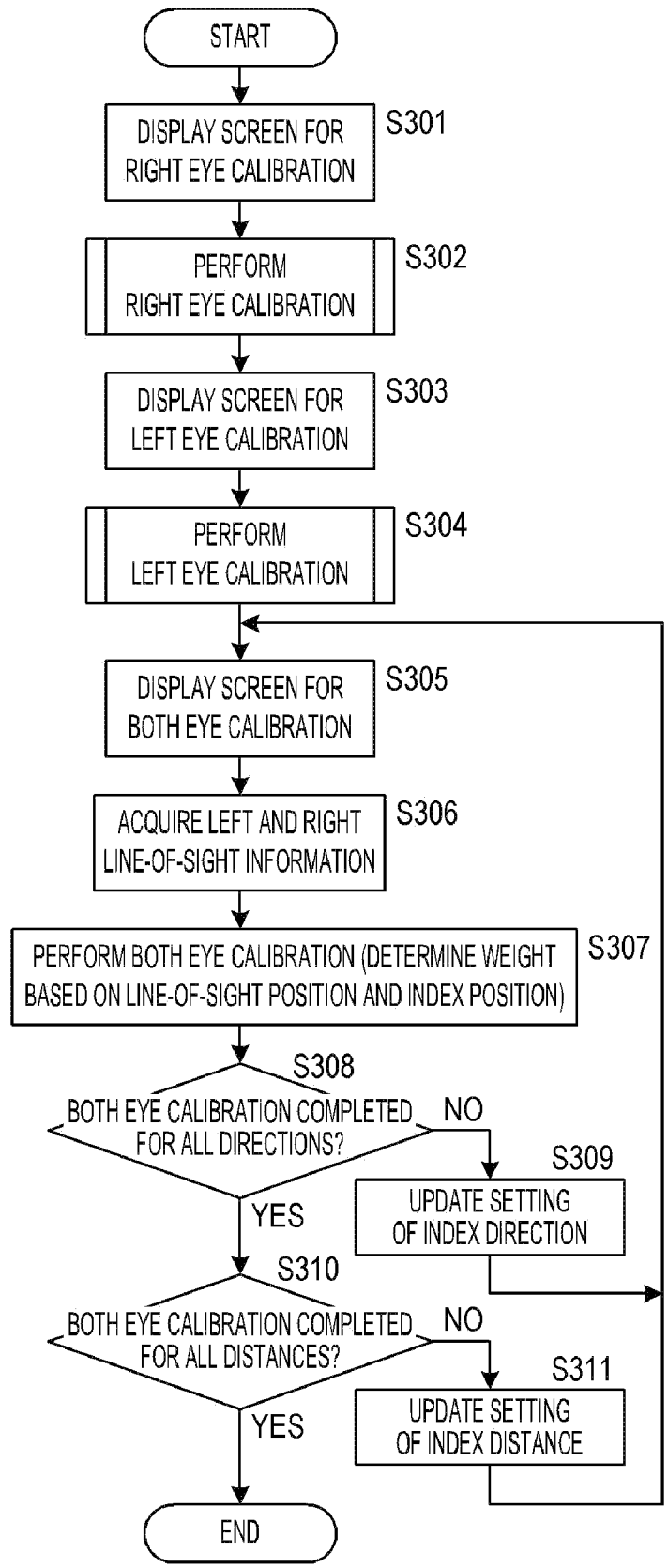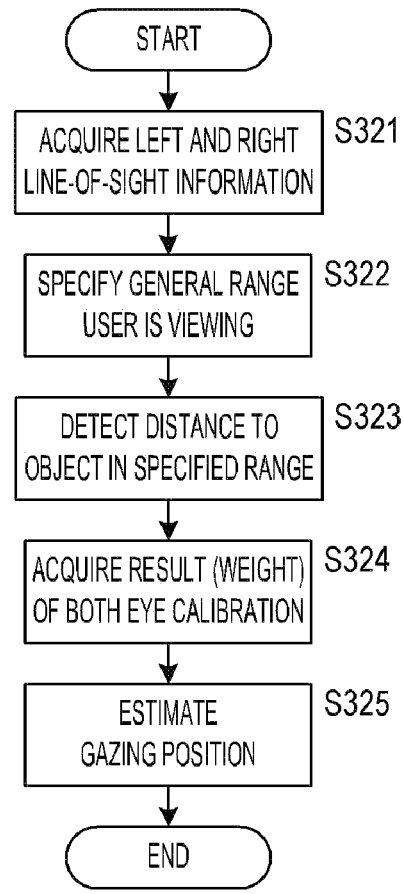
FIG. 3A
FIG. 3B

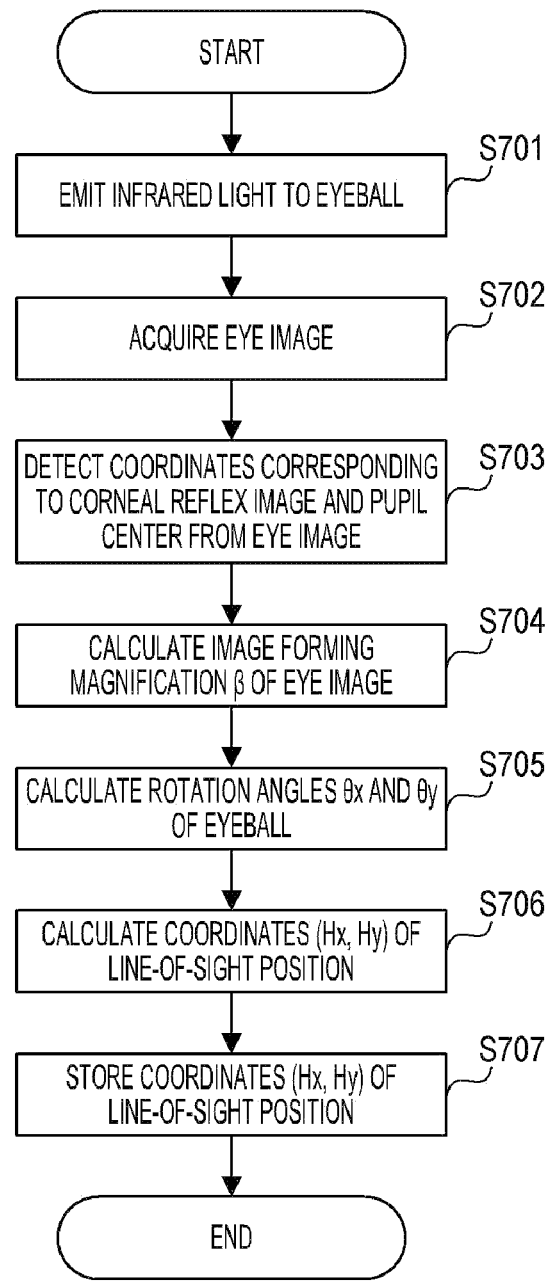

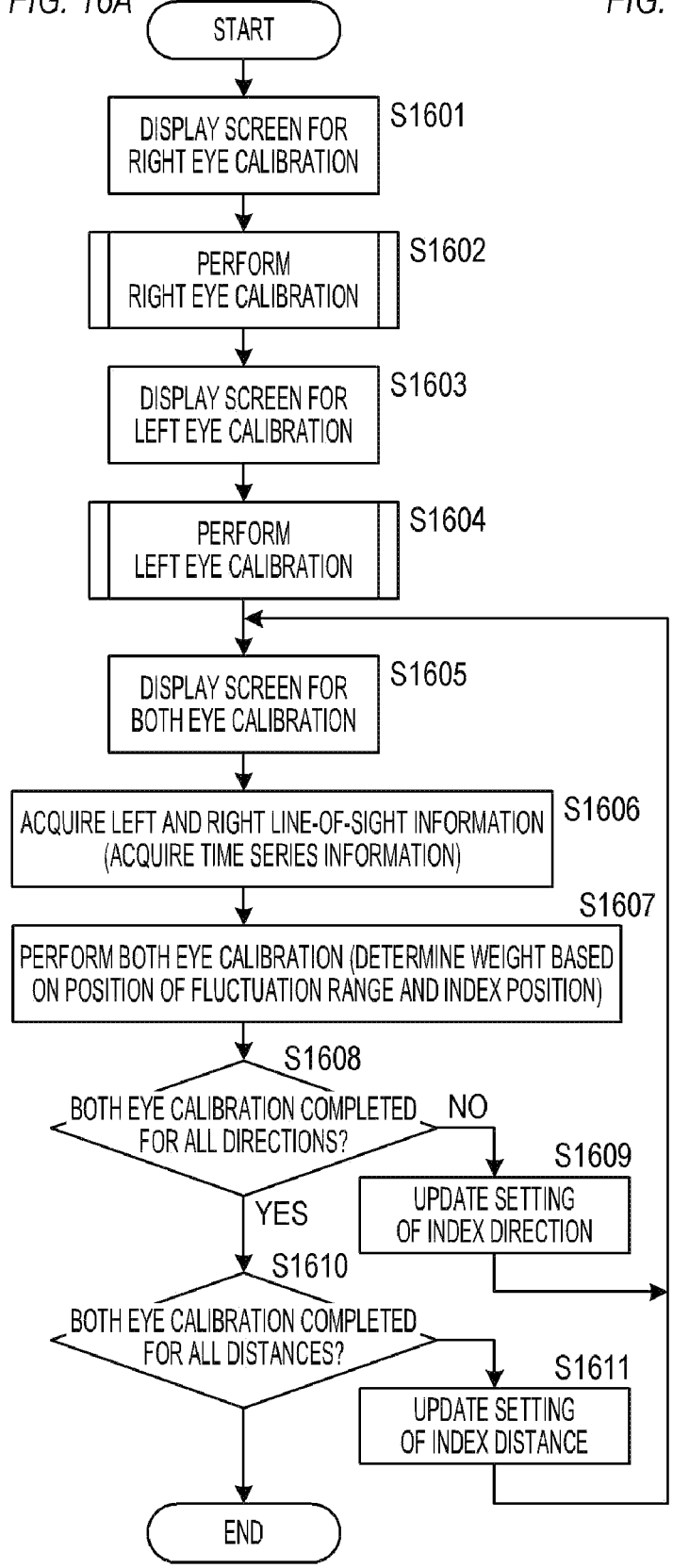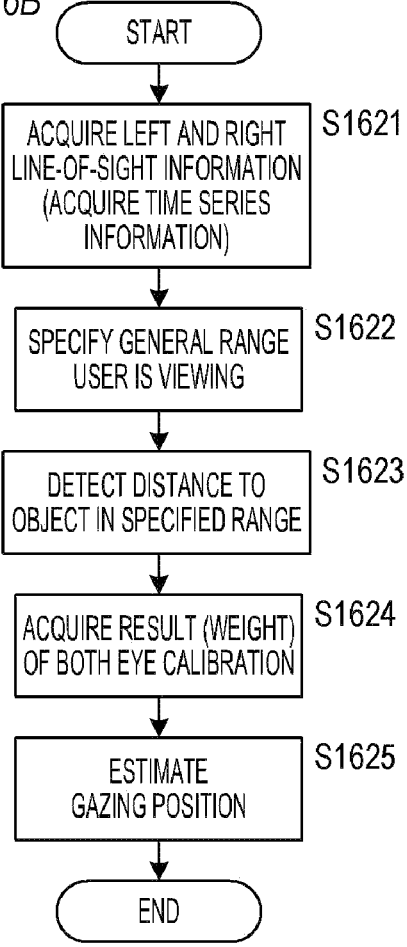

ELECTRONIC APPARATUS

BACKGROUND OF THE INVENTION

Field of the Invention

The present invention relates to an electronic apparatus that can execute calibration for line-of-sight detection.

Description of the Related Art

With the spread of head mounted displays (HMDs), techniques to integrate real world and virtual world are advancing. Such techniques are called cross realities (XRs), and include virtual reality (VR), augmented reality (AR), mixed reality (MR) and the like. In VR, a virtual world is displayed, and in AR and MR, a virtual world and virtual objects are superimposed and displayed on a real world.

In XR or the like, a line-of-sight position of the user is detected so as to specify an object the user is gazing at or an intention of the user, and processing in according with the specified result is performed, whereby the realistic sensations of the user can be enhanced and user friendliness can be improved.

Japanese Patent Application Publication No. 2021-51180 discloses a technique of detecting a gazing position of a user in a case of gazing at a real object and in a case of gazing at a virtual object, and adjusting the display position of a virtual object based on these gazing positions, so that burden imposed on the user, due to the difference between these gazing positions, can be reduced.

However, in the technique disclosed in Japanese Patent Application Publication No. 2021-51180, the processing to acquire the desired effects cannot be performed appropriately unless the line-of-sight position and the gazing position of the user can be detected accurately.

SUMMARY OF THE INVENTION

The present invention provides a technique to acquire highly precise information (accurate information) as information on the line-of-sights of the right eye and the left eye of the user.

The present invention in its first aspect provides an electronic apparatus including at least one memory and at least one processor which function as: a first acquisition unit configured to acquire right line-of-sight information on a line-of-sight of a right eye of a user; a second acquisition unit configured to acquire left line-of-sight information on a line-of-sight of a left eye of the user; and a control unit configured to control such that right eye calibration is performed on a basis of right line-of-sight information which is acquired by the first acquisition unit at a first timing, and left eye calibration is performed on a basis of left line-of-sight information which is acquired by the second acquisition unit at a second timing which is different from the first timing.

The present invention in its second aspect provides an electronic apparatus including at least one memory and at least one processor which function as: a control unit configured to control to perform calibration on line-of-sight detection in a head mounted display, wherein in a state where a user is wearing the head mounted display, a first display of the head mounted display faces a right eye of the user, and a second display of the head mounted display faces a left eye of the user, and the control unit controls such that the second display is turned OFF and an index is displayed on the first display at a first timing in a series of operations including the calibration; and controls such that the first display is turned OFF and an index is displayed on the second display at a second timing in the series of operations including the calibration.

The present invention in its third aspect provides a control method of an electronic apparatus, including: acquiring right line-of-sight information on a line-of-sight of a right eye of a user at a first timing; acquiring left line-of-sight information on a line-of-sight of a left eye of the user at a second timing; and controlling such that right eye calibration is performed on a basis of the acquired right line-of-sight information, and left eye calibration is performed on a basis of the acquired left line-of-sight information.

The present invention in its fourth aspect provides a non-transitory computer readable medium that stores a program, wherein the program causes a computer to execute the above described control method.

Further features of the present invention will become apparent from the following description of exemplary embodiments with reference to the attached drawings.

BRIEF DESCRIPTION OF THE DRAWINGS

FIG. 3A is a flow chart of a calibration operation according to Embodiment 1;

FIG. 3B is a flow chart of a gazing position estimation operation according to Embodiment 1;

FIG. 7 is a flow chart of the line-of-sight detection operation for one eye;

FIG. 16A is a flow chart of a calibration operation according to Embodiment 3; and FIG. 16B is a flow chart of a gazing position estimation operation according to Embodiment 3.

DESCRIPTION OF THE EMBODIMENTS

Embodiment 1

Embodiment 1 of the present invention will be described. In Embodiment 1, an example where the present invention is applied to a video see-through type head mounted display (HMD) will be described, but the present invention is also applicable to an optical see-through type HMD. In the video see-through type HMD, an image (virtual space) capturing a real space (external world) is combined with an image of a virtual object when necessary, and is displayed in this state. The user wearing the video see-through type HMD (on their head) cannot directly see the real space, but can indirectly see the real space by viewing the displayed image. In the case of the optical see-through type HMD, on the other hand, the HMD has lenses similar to the lenses of standard glasses, and an image of a virtual object is projected onto the lenses. The user wearing the optical see-through type HMD can directly see the real space via the lenses. Further, the user can also see the virtual object projected onto the lenses.

The present invention is also applicable to electronic apparatuses other an HMD. For example, the present invention is applicable to various electronic apparatuses that can be controlled to perform calibration related to the line-of-sight detection in the HMD. The present invention is also applicable to a personal computer (PC), a game machine, or the like connected to the HMD. In Embodiment 1, an example of applying the present invention to augmented reality (AR) or mixed reality (MR) will be described, but the present invention is also applicable to other cross realities (XRs), such as virtual reality (VR). In Embodiment 1, an example of detecting the line-of-sight position of the user wearing an HMD will be described, but the present invention is not limited thereto but is also applicable to the case of detecting a line-of-sight position of the user look at a commonly used display device.

Figure 1A:
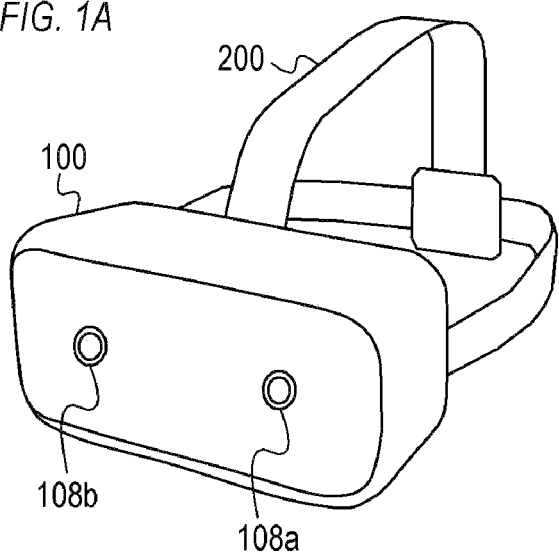
FIGS. 1A and 1B are external views of a head mounted display (HMD)
Figure 1B:
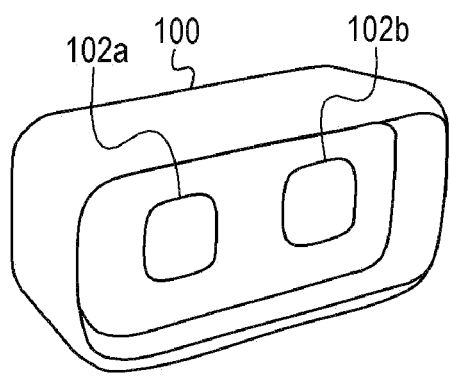

FIGS. 1A and 1B are external views of an HMD 100 according to Embodiment 1. As illustrated in FIG. 1A, a head band 200 is disposed on the HMD 100. The user sets the HMD 100 so as to be in contact with their eyes, and secures the HMD 100 on their head using the head band 200. A left imaging device 108a is a camera to capture a real space (external world) to be displayed for the left eye, and a right imaging device. 108b is a camera to capture a real space (external world) to be displayed for the right eye. An image captured by the left imaging device 108a is displayed on a left display panel (not illustrated) which can be visually recognized via a left eyepiece unit 102a indicated in FIG. 1B. An image captured by the right imaging device 108b is displayed on a right display panel (not illustrated) which can be visually recognized via a right eyepiece unit 102b indicated in FIG. 1B. The user aligns their left eye with the left eyepiece unit 102a, and looks into the left display panel with their left eye through the left eyepiece unit 102a; and aligns their right eye with the right eyepiece unit 102b and looks into the right display panel with their right eye through the right eyepiece unit 102b.

Figure 2:
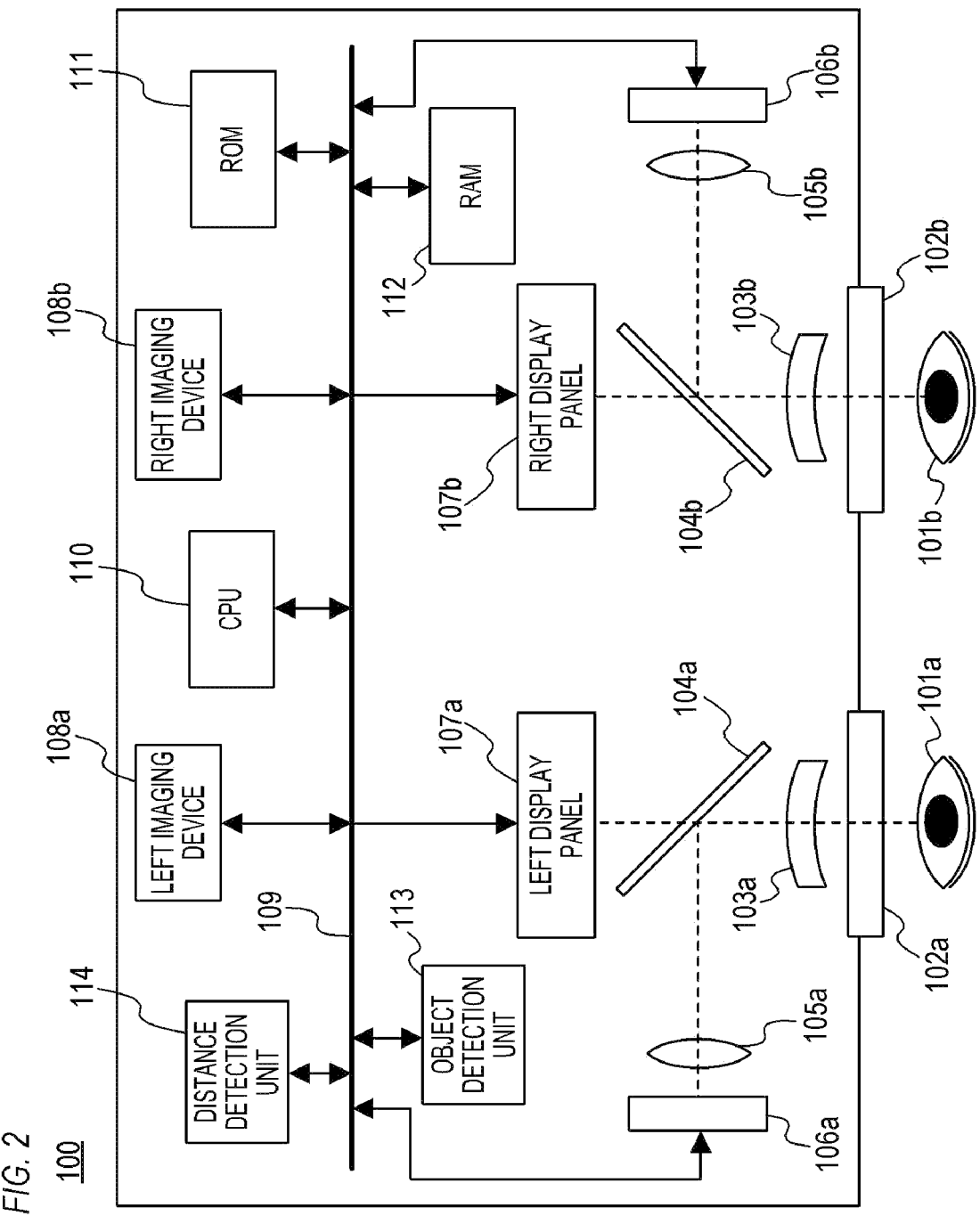
FIG. 2 is a block diagram depicting an internal configuration of the HMD.

FIG. 2 is a block diagram depicting an internal configuration of the HMD 100. A left eye 101a is the left eye of the user, and a right eye 101b is the right eye of the user.

A left eyepiece lens 103a is a lens to magnify an image displayed on a left display panel 107a, and a right eyepiece lens 103b is a lens to magnify an image displayed on a right display panel 107b. The user views these magnified images.

A left light divider 104a transmits the light from the left display panel 107a (image displayed on the left display panel 107a), and guides the light to the left eyepiece lens 103a. Further, the left light divider 104a reflects the light from the left eyepiece lens 103a and the left eyepiece unit 102a (object light indicating the left eye 101a reflected by the left eye 101a), and guides this light to a left light-receiving lens 105a. The right light divider 104b transmits the light from the right display panel 107b (image displayed on the right display panel 107b), and guides this light to the right eyepiece lens 103b. Further, the right light divider 104b reflects the light from the right eyepiece lens 103b and the right eyepiece unit 102b (object light indicating the right eye 101b reflected by the right eye 101b), and guides this light to a right light-receiving lens 105b.

The left light-receiving lens 105a guides the light from the left light divider 104a to a left image pickup element 106a, and the right light-receiving lens 105b guides the light from the right light divider 104b to a right image pickup element 106b.

The left image pickup element 106a photo-electrically converts the light which entered from the left light-receiving lens 105a. Thereby the left eye 101a is imaged. The right image pickup element 106b photo-electrically converts the light which entered from the right light-receiving lens 105b. Thereby the right eye 101b is imaged. The image data on the left eye 101a and the image data on the right eye 101b are sent to the required blocks via a bus 109.

The left display panel 107a is a display unit that displays an image captured by the left imaging device 108a. In some cases, the left display panel 107a also displays an image generated by superimposing an image of a virtual object on an image captured by the left imaging device 108a. In the state where the user is wearing the HMD 100, the left display panel 107a faces the left eye 101a of the user. The right display panel 107b is a display unit that displays an image captured by the right imaging device 108b. In some cases, the right display panel 107b also displays an image generated by superimposing an image of a virtual object on an image captured by the right imaging device 108b. In the state where the user is wearing the HMD 100, the right display panel 107b faces the right eye 101b of the user. Using the display for the right eye and the display for the left eye, the HMD 100 can implement a three-dimensional display, where a virtual object is disposed in a three-dimensional space (three-dimensional space centering around the HMD 100 (user wearing the HMD 100)).

The left imaging device 108a and the right imaging device 108b are disposed with an interval corresponding to the interval between the left eye and the right eye of a human. Using the left imaging device 108a and the right imaging device 108b, two images with parallax of the left eye and the right eye are captured.

The bus 109 is a bus to enable transmission and reception of data among the blocks, and data can be transmitted and received among the blocks connected to the bus 109.

A central processing unit (CPU) 110 controls each block of the HMD 100, and performs various processing of the HMD 100. For example, the CPU 110 can detect the line-of-sight direction and the line-of-sight position of the user (line-of-sight detection) using the images captured by the left image pickup element 106a and the right image pickup element 106b (images of the eyes of the user). The line-of-sight direction may be regarded as a direction which is parallel with the line-of-sight of the user. The line-of-sight position may be regarded as a position at which the user is looking (position where the line-of-sight of the user is directed). The CPU 110 can also detect an object from the images captured by the left imaging device 108a and the right imaging device 108b (captured images) by controlling an object detection unit 113 (object detection). Furthermore, the CPU 110 can detect a distance from the HMD 100 (user wearing the HMD 100) to an object by controlling a distance detection unit 114 (distance detection).

In a read only memory (ROM) 111, programs of processing executed by the CPU 110, information required for processing and the like are stored in advance. In a random access memory (RAM) 112, data on images captured by the left image pickup element 106a, the right image pickup element 106b, the left imaging device 108a, the right imaging device 108b and the like are stored. The RAM 112 is also used as a work memory which temporarily stores data required for processing by the CPU 110.

The object detection unit 113 detects an object which exists in images (visual field of the user in three-dimensional space) captured by the left imaging device 108a and the right imaging device 108b (object detection). By the object detection, the object detection unit 113 can acquire such information as position, type and size of the detected object.

The distance detection unit 114 detects (calculates) a distance from the HMD 100 to the detected object (object detected by the object detection unit 113) using a difference between the image captured by the left imaging device 108a and the image captured by the right imaging device 108b.

FIG. 3A is a flow chart of a calibration operation (series of operations including calibration) performed by the HMD 100. The calibration operation in FIG. 3A is, for example, performed when the HMD 100 is initially started up, performed periodically, or performed responding to an instruction from the user (e.g. instruction to start calibration). Here it is assumed that the user is wearing the HMD 100.

Figure 4A:
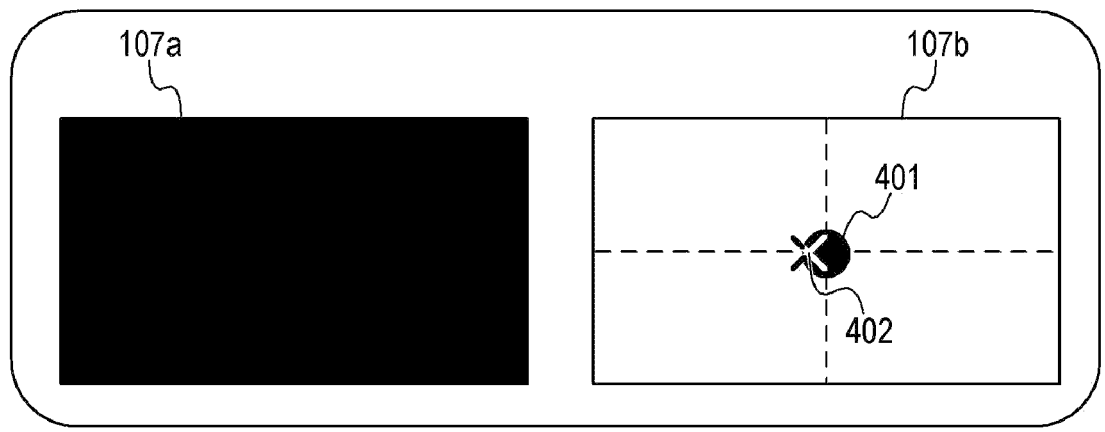
FIGS. 4A to 4C are diagrams depicting display during calibration.

In step S301 (first timing), the CPU 110 performs control so as to display a screen for a right eye calibration (described later). For example, as illustrated in FIG. 4A, the left display panel 107a is turned OFF (non-display state), and an index 401 (index for the right eye calibration, index for the user to gaze at) is displayed on the right display panel 107b. Thereby the user is prompted to gaze at the index 401 with their right eye. A position 402 is a line-of-sight position (estimated position) of the right eye detected by the line-of-sight detection operation (described later), and need not be displayed on the right display panel 107b.

In step S302, the CPU 110 performs the right eye calibration. The right eye calibration is a calibration to improve accuracy of the line-of-sight detection (line-of-sight direction operation) for the right eye. The right eye calibration may also be regarded as a calibration to improve accuracy of the right line-of-sight information (information on the line-of-sight of the right eye) to be acquired.

Figure 4B:
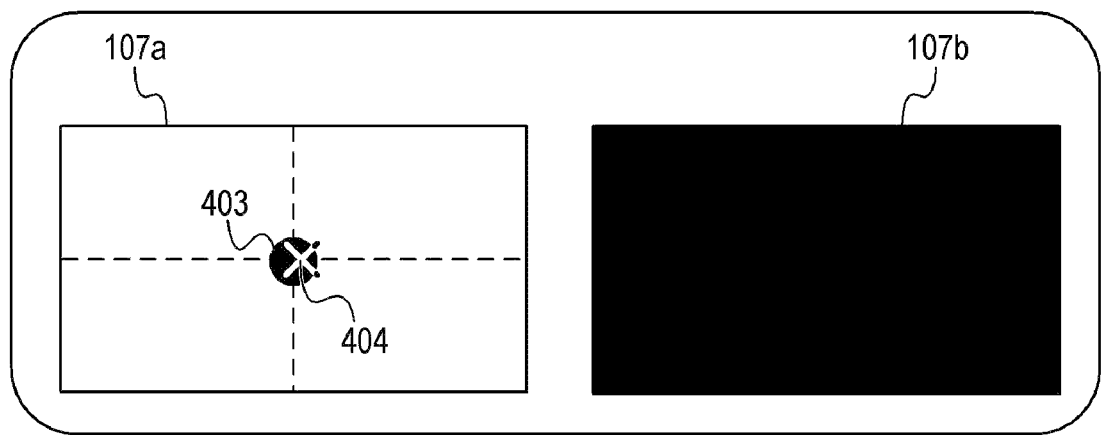

In step S303 (second timing), the CPU 110 performs control so as to display a screen for a left eye calibration (described later). For example, as illustrated in FIG. 4B, the right display panel 107b is turned OFF (non-display state), and an index 403 (index for the left eye calibration, index for the user to gaze at) is display on the left display panel 107a. Thereby the user is prompted to gaze at the index 403 with their left eye. A position 404 is a line-of-sight position (estimation position) of the left eye detected by the line-of-sight detection operation (described later), and need not be displayed on the left display panel 107a.

In step S304, the CPU 110 performs the left eye calibration. The left eye calibration is to improve accuracy of the line-of-sight detection (line-of-sight detection operation) for the left eye. The left eye calibration may also be regarded as a calibration to improve accuracy of the left line-of-sight information (information on the line-of-sight of the left eye) to be acquired.

Figure 5:
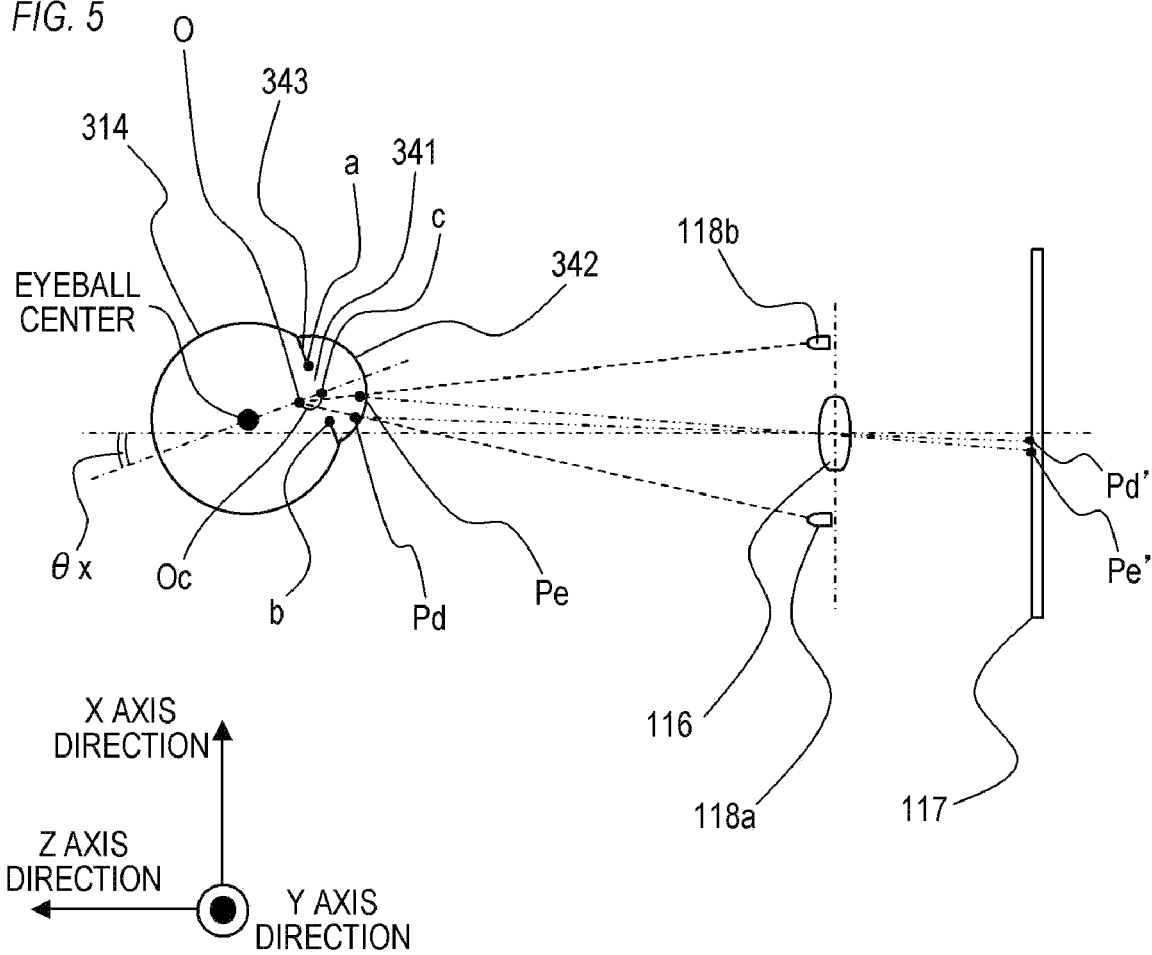
FIG. 5 is a diagram for describing a principle of a line-of-sight detection method for one eye.
Figure 6A:
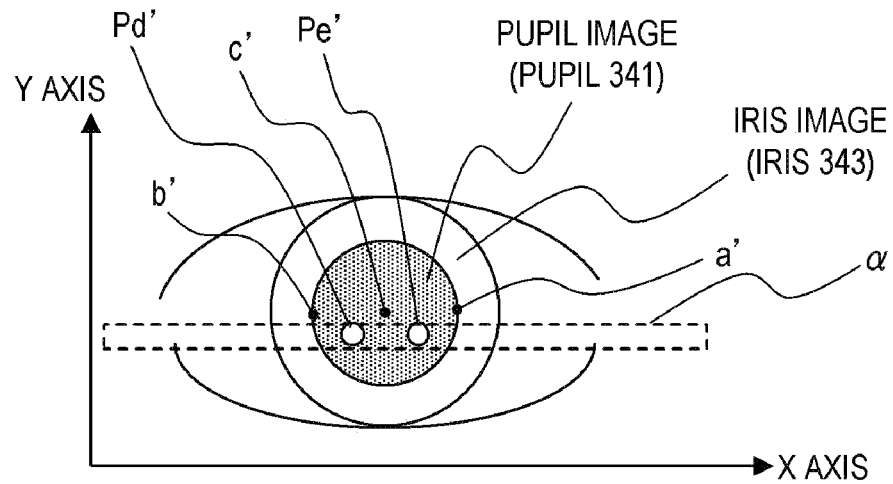
FIG. 6A is a diagram depicting an eye image.
Figure 6B:
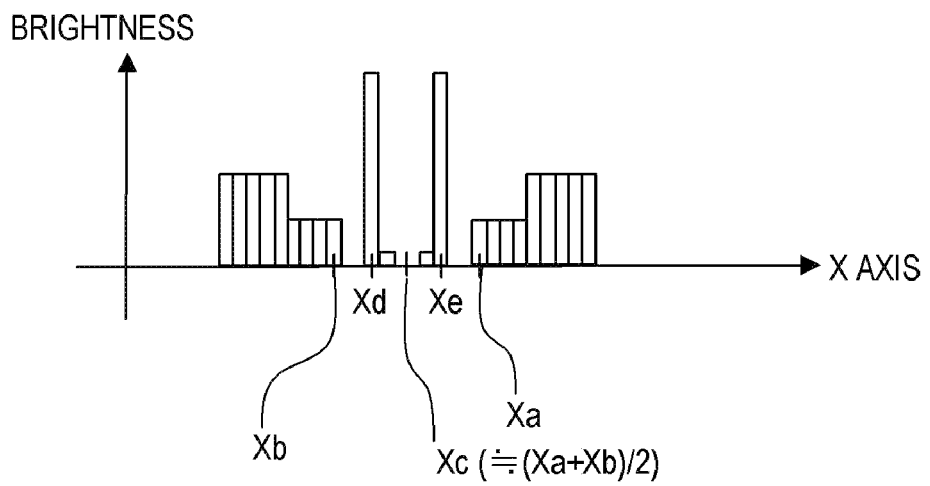
FIG. 6B is a diagram depicting a brightness distribution of the eye image.

FIG. 5 is a diagram for describing the principle of the line-of-sight detection method for one eye, and is a schematic diagram of an optical system for performing the line-of-sight detection for one eye. FIG. 6A is a schematic diagram of an eye image captured by an eye image pickup element 117 (optical image projected onto the eye image pickup element 117), and FIG. 6B is a diagram indicating the output intensity of a CCD in the eye image pickup element 117. FIG. 7 is a flow chart of the line-of-sight detection operation for one eye. The eye image pickup element 117 is either the left image pickup element 106a or the right image pickup element 106b.

When the line-of-sight detection operation starts, the CPU 110 controls light sources 118a and 118b in step S701 in FIG. 7, so as to emit infrared light to an eyeball 314 of the user. An optical image of the eyeball 314 illuminated by the infrared light forms an image on the eye image pickup element 117 via a light-receiving lens 116, and is photo-electrically converted by the eye image pickup element 117. Thereby a processable electric signal of the eye image can be acquired.

In step S702, the CPU 110 acquires the eye image (eye image signals, electric signals of the eye image) from the eye image pickup element 117.

In step S703, the CPU 110 detects the coordinates of points corresponding to corneal reflex images Pd and Pe of the light sources 118a and 118b and a pupil center c from the eye image acquired in step S702.

The infrared lights emitted from the light sources 118a and 118b illuminate a cornea 342 of the eyeball 314 of the user. Here the corneal reflex images Pd and Pe, formed by a part of the infrared lights reflected on the surface of the cornea 342, are collected by the light-receiving lens 116, and form images on the eye image pickup element 117. These images become the corneal reflex images Pd' and Pe' of the eye image. In the same manner, the lights from the edges a and b of a pupil 341 also form images on the eye image pickup element 117, and become pupil edge images a' and b' of the eye image.

FIG. 6B indicates the brightness information (brightness distribution) of a region a in the eye image in FIG. 6A. In FIG. 6B, the horizontal direction of the eye image is the X axis direction, and the vertical direction thereof is the Y axis direction, and the brightness distribution in the X axis direction is indicated. In Embodiment 1, it is assumed that the coordinates of the corneal reflex images Pd' and Pe' in the X axis direction (horizontal direction) are Xd and Xe, and the coordinates of the pupil edge images a' and b' in the X axis direction are Xa and Xb. As indicated in FIG. 6B, an extremely high level of brightness is acquired at the coordinates Xd and Xe of the corneal reflex images Pd' and Pe'. In a region from the coordinate Xa to the coordinate Xb, which corresponds to the region of the pupil 341 (region of the pupil image acquired when the light from the pupil 341 forms an image on the eye image pickup element 117), an extremely low level of brightness is acquired except for the coordinates Xd and Xe. In a region of an iris 343 outside the pupil 341 (region of the iris image outside the pupil image acquired when the light from the iris 343 forms an image), an intermediate brightness between the above two types of brightness is acquired. For example, in a region of which the X coordinate (coordinate in the X axis direction) is larger than the coordinate Xa, and in a region of which the X coordinate is smaller than the coordinate Xb, an intermediate brightness between the above mentioned two types of brightness is acquired.

From the brightness distribution indicated in FIG. 6B, the X coordinates Xd and Xe of the corneal reflex images Pd' and Pe' and the X coordinates Xa and Xb of the pupil edge images a' and b' can be acquired. For example, the coordinates of which brightness is extremely high can be acquired as the coordinates of the corneal reflex images Pd' and Pe', and the coordinates of which brightness is extremely low can be acquired as the coordinates of the pupil edge images a' and b'. In a case where the rotation angle θx of the optical axis of the eyeball 314, with respect to the optical axis of the light-receiving lens 116, is small, the coordinate Xc of a pupil center image c' (center of the pupil image), that is acquired when the light from the pupil center c forms an image on the eye image pickup element 117, can be expressed by Xc≈(Xa+Xb/2). In other words, from the X coordinates Xa and Xb of the pupil edge images a' and b', the coordinate Xc of the pupil center image c' can be calculated. Thus the coordinates of the corneal reflex images Pd' and Pe' and the coordinate of the pupil center image c' can be estimated.

In step S704, the CPU 110 calculates an image forming magnification R of the eye image. The image forming magnification R is a magnification determined by the position of the eyeball 314 with respect to the light-receiving lens 116, and can be calculated using the function of the interval (Xd-Xe) between the corneal reflex images Pd' and Pe'.

In step S705, the CPU 110 calculates the rotation angle of the optical axis of the eyeball 314 with respect to the optical axis of the light-receiving lens 116. The X coordinates of the mid-point between the corneal reflex image Pd and the corneal reflex image Pe and the X coordinate of the curvature center O of the cornea 342 approximately match. Therefore if the standard distance from the curvature center O of the cornea 342 to the center c of the pupil 341 is Oc, the rotation angle θx of the eyeball 314 on the Z-X plane (plane perpendicular to the Y axis) can be calculated using the following Formula 1. The rotation axis θy of the eyeball 314 on the Z-Y plane (plane perpendicular to the X axis) can also be calculated with the same method as the case of calculating the rotation axis θx.

$$\beta \times Oc \times \sin \theta x \approx \{(Xd+Xe)/2\} - Xc \quad \text{(Formula 1)}$$

In step S706, the CPU 110 estimates the line-of-sight position of the user using the rotation angles θx and θy calculated in step S705. In the line-of-sight detection operation for the left eye, the line-of-sight position of the left eye on the display surface of the left display panel 107a is estimated, and in the line-of-sight detection operation for the right eye, the line-of-sight position of the right eye on the display surface of the right display panel 107b is estimated. If the coordinates (Hx, Hy) of the line-of-sight position are the coordinates corresponding to the pupil center c, the coordinates (Hx, Hy) of the line-of-sight position can be calculated using the following Formulae 2 and 3.

$$Hx = m \times (Ax \times \theta x + Bx) \quad \text{(Formula 2)}$$

$$Hy = m \times (Ay \times \theta y + By) \quad \text{(Formula 3)}$$

The parameter m of Formulae 2 and 3 is a conversion coefficient to convert the rotation angles θx and θy into coordinates corresponding to the pupil center c on the display surface. The parameter m is determined in advance and stored in the ROM 111. The parameters Ax, Bx, Ay and By are line-of-sight correction parameters to correct the individual differences of the line-of-sight, and the like, and are determined (acquired) by performing calibration of the line-of-sight detection. The line-of-sight correction parameters Ax, Bx, Ay and By are stored in the RAM 112 before starting the line-of-sight detection operation.

In step S707, the CPU 110 stores the coordinates (Hx, Hy) of the line-of-sight position in the RAM 112, and ends the line-of-sight detection operation.

The line-of-sight detection method is not limited to the above method, and any method may be used as long as the line-of-sight information can be acquired from the eye image, for example. The final line-of-sight information that is acquired may be information on the direction of the line-of-sight instead of the information on the line-of-sight position. For example, the processing up to acquiring the rotation angle (Ax×θx+Bx and Ay×θy+By) may be performed without acquiring the coordinates (Hx, Hy) of the line-of-sight position.

Figure 8A:
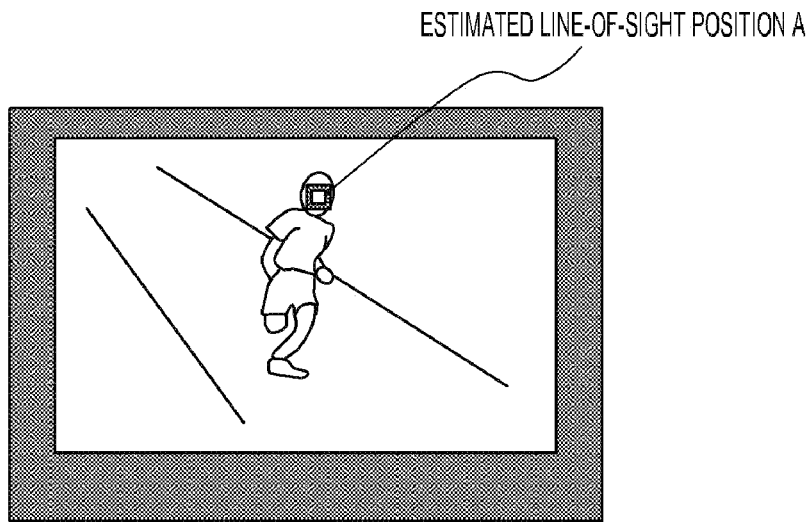
FIGS. 8A to 8C are diagrams depicting a field-of-view.

As mentioned above, in the line-of-sight detection operation, the rotation angles θx and θy of the eyeball 314 are acquired from the eye image, and the coordinates of the position of the pupil center c are converted into the coordinates of the position on the display surface, whereby the line-of-sight position can be estimated. FIG. 8A is a diagram indicating a field-of-view of the user (range in which the user can view). In FIG. 8A, the position A, which is the same as the actual line-of-sight position, is estimated as the line-of-sight position.

Figure 8B:
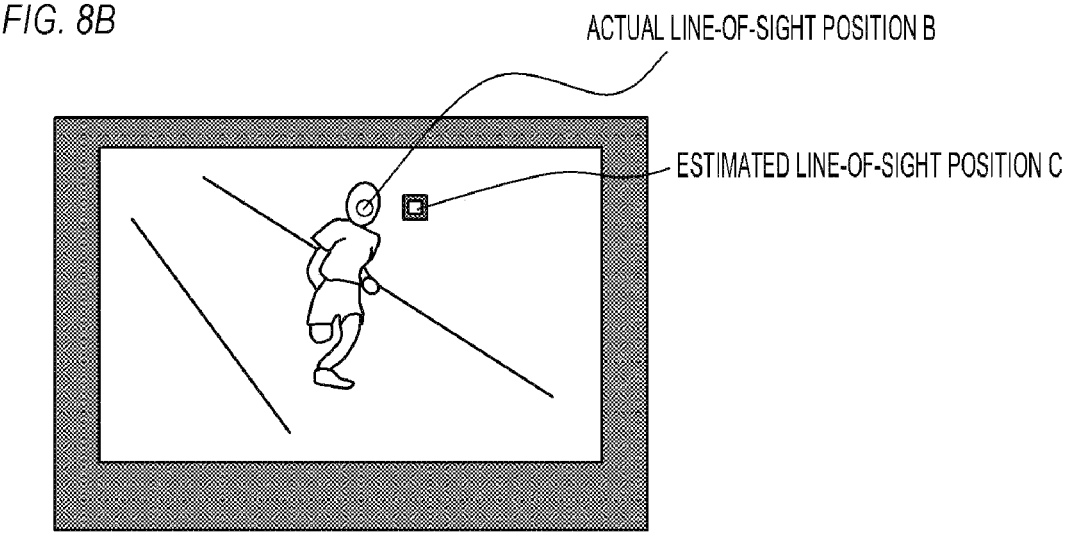

However in some cases, it may be difficult to accurately estimate the line-of-sight position (highly precise line-of-sight position cannot be acquired) due to such causes as the individual differences of the shapes of the human eyeball. For example, unless the line-of-sight correction parameters Ax, Ay, Bx and By are adjusted to values appropriate for the user, the actual line-of-sight position B and the estimated line-of-sight position C deviate, as illustrated in FIG. 8B. In FIG. 8B, the user is actually gazing at a person, but it is estimated in error that the user is gazing at the background.

Figure 8C:
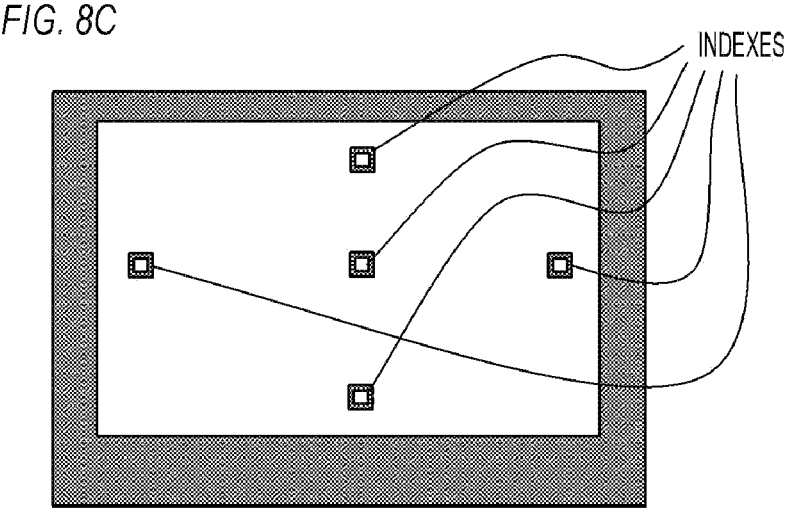

Therefore it is necessary to perform calibration of the line-of-sight detection before using the HMD 100 to determine the line-of-sight correction parameters Ax, Ay, Bx and By that are appropriate for the user, and store these parameters in the HMD 100. A known technique conventionally used for calibration is having the user look at a plurality of indexes displayed at different positions, as illustrated in FIG. 8C. Then the line-of-sight detection operation is performed when the user is gazing at each index, and the line-of-sight correction parameters Ax, Ay, Bx and By that are appropriate for the user are determined on the basis of the plurality of line-of-sight positions (estimated positions) that are calculated above and the coordinates of each index. In steps S302 and S304, this calibration is performed. For example, the CPU 110 acquires the right line-of-sight information in step S301, and performs the right eye calibration based on the right line-of-sight information in step S302. In the same manner, the CPU 110 acquires the left line-of-sight information in step S301, and performs the left eye calibration based on the left line-of-sight information in step S302.

A cause of an error that is generated in a line-of-sight position of one eye (reason why the above mentioned calibration is required) will be described. The cause of an error that is generated in a line-of-sight position of one eye includes, for example, a size of the eyeball and a position of a photoreceptor cell.

Figure 9A:
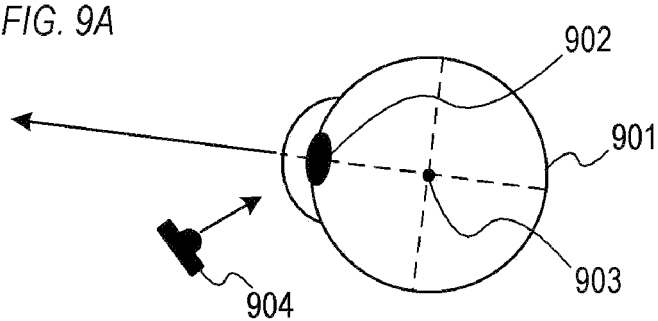
FIGS. 9A to 9F are diagrams for describing a cause of generating an error in a line-of-sight position of one eye.
Figure 9B:
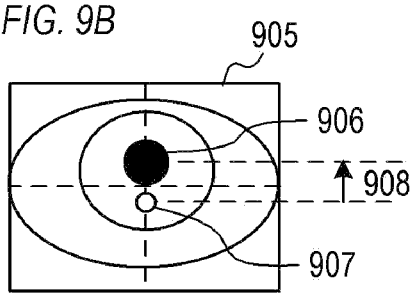
Figure 9C:
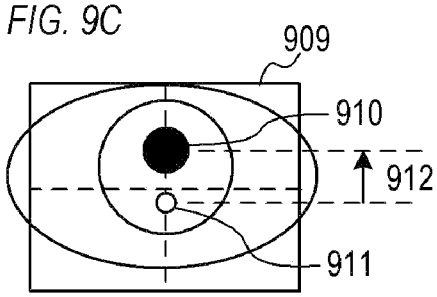

A case where the cause is the size of the eyeball will be described. The size of the eyeball is different depending on the person. Further, even with the same person, the size of the eyeball is different between the right eye and the left eye. As illustrated in FIG. 9A, an eyeball 901 can rotate around an eyeball enter 903. In a case of detecting the line-of-sight position, the light emitted from a light-emitting diode (LED) 904 and reflected by the eyeball 901 is detected by the image pickup element and the position of a pupil 902 is specified thereby, for example. An image 905 in FIG. 9B is an eye image of a person having a small eyeball, and an image 909 in FIG. 9C is an eye image of a person having a large eyeball. FIGS. 9B and 9C indicate the movement of a pupil when the eyeball rotates at a same angle. A position 907 in FIG. 9B and a position 911 in FIG. 9C are the positions of the pupil before the eyeball is rotated, and correspond to the same line-of-sight direction. In FIGS. 9B and 9C, the rotation angles of the eyeball are the same, but the moving distances of the pupil on the eye image are different since the sizes of the eyeballs are different. A distance 912 from the position 911 to the pupil 910 in FIG. 9C is longer than a distance 908 from the position 907 to the pupil 906 in FIG. 9B. The above mentioned calibration is required in order to suppress the deviation of the line-of-sight positions (estimated positions) due to such difference.

Figure 9D:
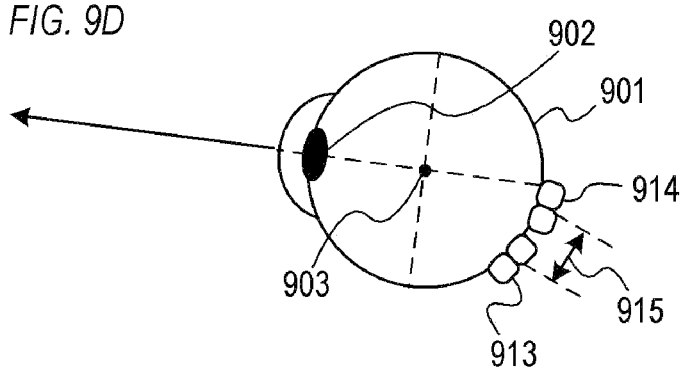
Figure 9E:
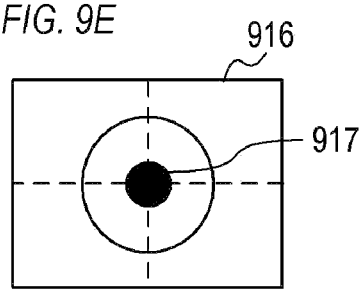
Figure 9F:
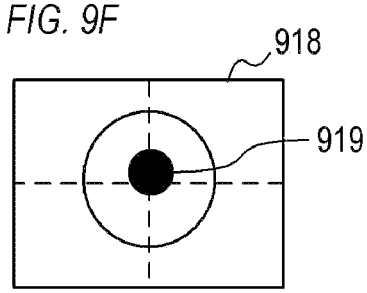

A case where the cause is the position of the photoreceptor cell will be described. The position of the photoreceptor cell is different depending on the person. Further, even with the same person, a position of the photoreceptor cell is different between the right eye and the left eye. As illustrated in FIG. 9D, a photoreceptor cell, to detect the light that enters through the iris, is disposed on the opposite side of the pupil 902 of the eyeball 901. An image 916 in FIG. 9E is an eye image of a person who has the photoreceptor cell at a position 913, and an image 918 in FIG. 9F is an eye image of a person who has the photoreceptor cell at a position 914, which is distant from the position 913 by a distance 915, and both eye images correspond to the same line-of-sight direction. In FIGS. 9E and 9F, the position of the pupil in each eye image is different (pupils 917, 919) since the position of the photoreceptor cell is different even if the line-of-sight direction is the same. The above mentioned calibration is also required to suppress the deviation of the line-of-sight positions (estimated positions) due to such difference.

Figure 4C:
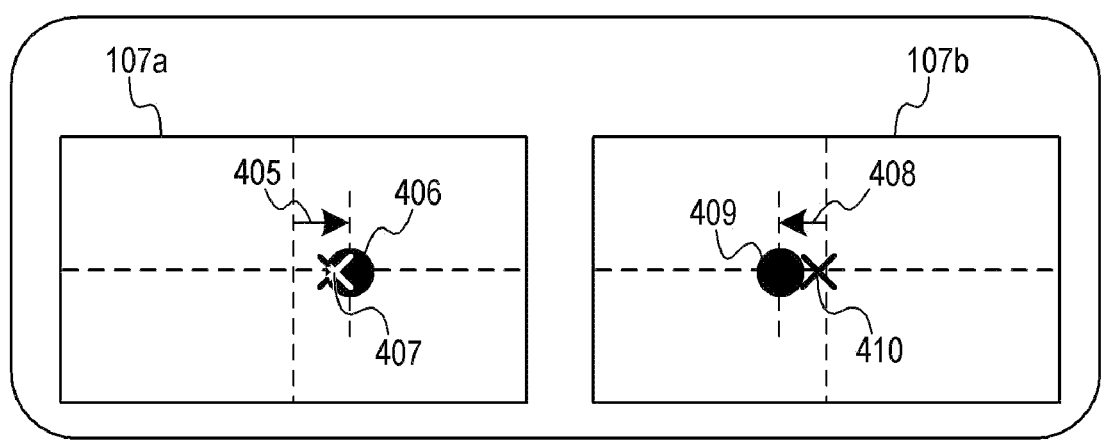

The description on FIG. 3A continues. In step S305 (third timing), the CPU 110 performs control so as to display a screen for both eye calibration (described later). For example, as illustrated in FIG. 4C, an index 406 is displayed on the left display panel 107a, and an index 409 is displayed on the right display panel 107b. Thereby the user is prompted to gaze at the indexes 406 and 409 with both eyes. The index 406 and the index 409 are indexes corresponding to one point in the three-dimensional space (indexes for both eye calibration, indexes for the user to gaze at), and are displayed with parallax. In FIG. 4C, the index 406 is displayed at a position that is distant from the center of the left display panel 107a, in the right direction by a distance 405, and the index 409 is displayed at a position that is distant from the center of the right display panel 107b, in the left direction by a distance 408. A position 407 is a line-of-sight position (estimated position) of the left eye detected by the line-of-sight detection operation for the left eye, and need not be displayed on the left display panel 107a. In the same manner, a position 410 is a line-of-sight position (estimated position) of the right eye detected by the line-of-sight detection operation for the right eye, and need not be displayed on the right display panel 107b.

A reason why both eye calibration is required will be described. The both eye calibration is a calibration to improve the accuracy of estimating the gazing position by the user (with both eyes).

Figure 10A:
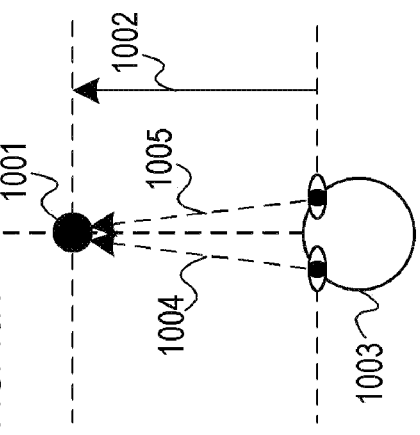
FIGS. 10A to 10D are diagrams for describing a cause of requiring both eye calibration.
Figure 10B:
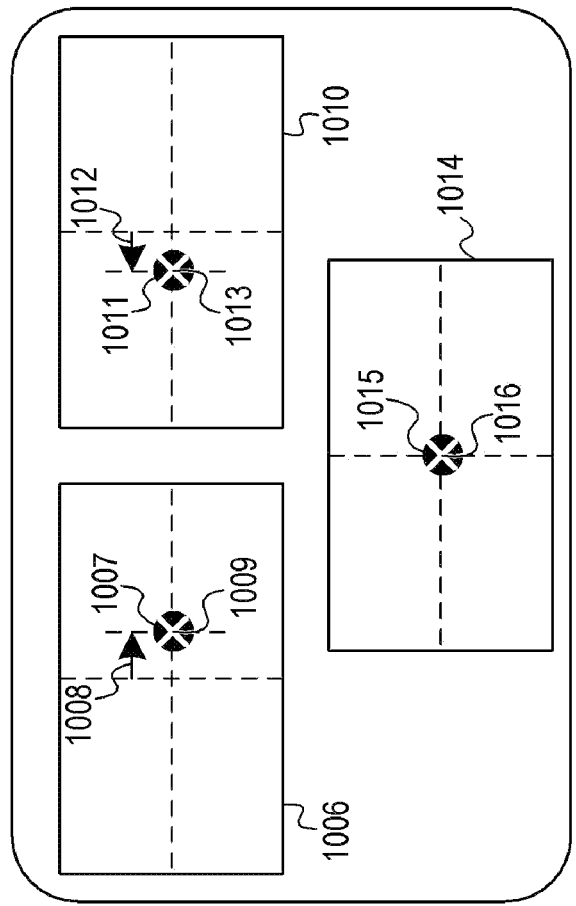

FIGS. 10A and 10B indicate an ideal state where an object (one point) in the three-dimensional space is accurately focused on by the line-of-sight of the right eye (right eye line-of-sight), and the line-of-sight of the left eye (left eye line-of-sight).

FIG. 10A is a schematic diagram depicting a relationship between an index 1001 and a user 1003. The index 1001 is located at a position distant from the user 1003 by a distance 1002, and a left eye line-of-sight 1004 and a right eye line-of-sight 1005 are focused on the index 1001.

FIG. 10B indicates the display screen and the line-of-sight position (estimated position, line-of-sight detection result) in the state of FIG. 10A. On the left display panel 107a, a display screen 1006, including an index 1007 corresponding to the index 1001, is displayed, and on the right display panel 107b, a display screen 1010, including an index 1011 corresponding to the index 1001, is displayed. The index 1007 and the index 1011 are displayed with parallax corresponding to the distance 1002. The index 1007 is displayed at a position that is distant from the center of the left display panel 107a (display screen 1006) in the right direction by a distance 1008; and the index 1011 is displayed at a position that is distant from the center of the right display panel 107b (display screen 1010) in the left direction by a distance 1012. The left eye calibration has been performed, hence a line-of-sight position 1009 of the left eye matches with the position of the index 1007. In the same manner, the right eye calibration has been performed, hence a line-of-sight position 1013 of the right eye matches with the position of the index 1011.

The display screen 1006 and the display screen 1010 are integrated in the mind of the user, and the user visual field image 1014 is generated. In the user visual field image 1014, an index 1015, corresponding to the index 1001, is located at the center (center direction). On the basis of the parallax between the index 1007 and the index 1011, the user can sense the distance to the index 1015 (distance 1002). A gazing position 1016 of the user (with both eyes) can be estimated by combining the line-of-sight position 1009 of the left eye and the line-of-sight position 1013 of the right eye. The gazing position 1016 is an average position between the line-of-sight position 1009 (relative position of the line-of-sight position 1009 with respect to the display screen 1006) and the line-of-sight position 1013 (relative position of the line-of-sight position 1013 with respect to the display screen 1010), for example. The gazing position 1016 matches with a position of an index 1015.

Figure 10C:
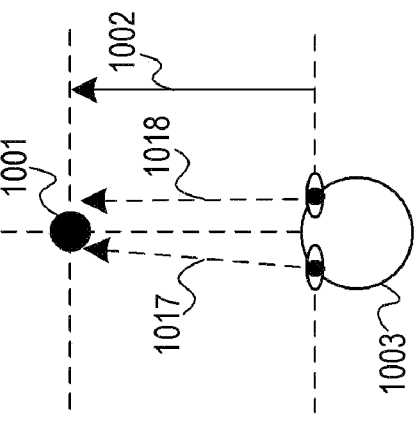
Figure 10D:
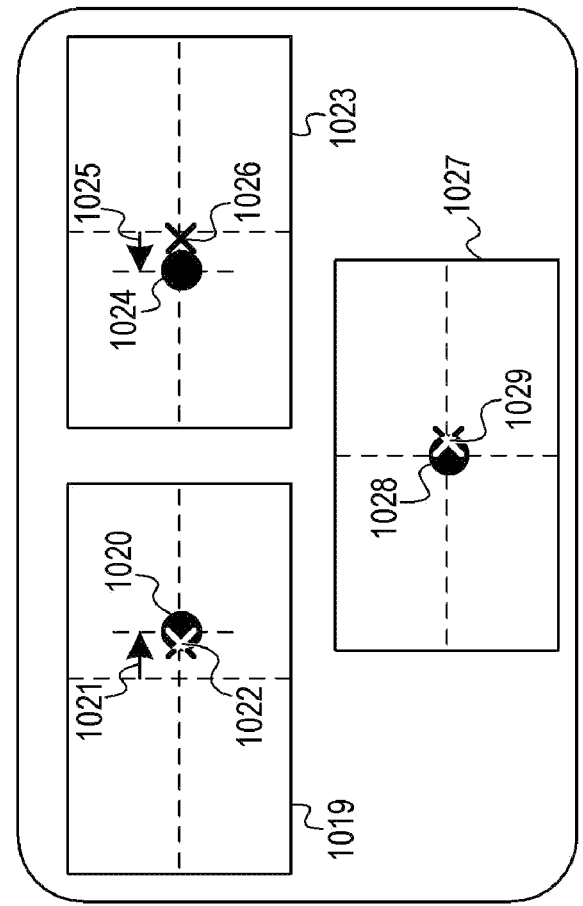

However, in some cases the right eye line-of-sight and the left eye line-of-sight may not accurately focus on an object (one point) in a three-dimensional space. For example, because of the influence of the characteristics of ocular muscles and the influence of the dominant eye, the user may have difficulty to form a convergence angle between the line-of-sight direction of the right eye and the line-of-sight direction of the left eye in such a way that the right eye line-of-sight and the left eye line-of-sight accurately focus on the object. FIGS. 10C and 10D indicate such a state.

FIG. 10C is a schematic diagram depicting a relationship between the index 1001 and the user 1003. The index 1001 is located at a position that is distant from the user 1003 by the distance 1002. A left eye line-of-sight 1017 and a right eye line-of-sight 1018 are not focused on the index 1001. Here it is assumed that the left eye is the dominant eye of the user 1003. Therefore the left line-of-sight 1017 is directed closer to the index 1001 compared with the right eye line-of-sight 1018.

FIG. 10D indicates the display screen and the line-of-sight position (estimated position, line-of-sight detection result) in the state of FIG. 10C. On the left display panel 107a, a display screen 1019, including an index 1020 corresponding to the index 1001, is displayed, and on the right display panel 107b, a display screen 1023, including an index 1024 corresponding to the index 1001, is displayed. The index 1020 and the index 1024 are displayed with parallax corresponding to the distance 1002. The index 1020 is displayed at a position that is distant from the center of the left display panel 107a (display screen 1019) in the right direction by a distance 1021; and an index 1024 is displayed at a position that is distant from the center of the right display panel 107b (display screen 1023) in the left direction by a distance 1025. The left eye calibration has been performed, hence a line-of-sight position 1022 of the left eye has been accurately estimated as the line-of-sight position of one eye. However, the left eye line-of-sight 1017 is not focused on the index 1001, as indicated in FIG. 10C, hence the line-of-sight position 1022 deviates from the position of the index 1020. In the same manner, the right eye calibration has been performed, hence a line-of-sight position 1026 of the right eye has been accurately estimated as the line-of-sight position of one eye. However, the right line-of-sight 1018 is not focused on the index 1001, as indicated in FIG. 10C, hence the line-of-sight position 1026 deviates from the position of the index 1024. Since the left eye is the dominant eye, the deviation amount (distance) between the line-of-sight position 1022 of the left eye and the position of the index 1020 is smaller than the deviation amount between the line-of-sight position 1026 of the right eye and the position of the index 1024.

The display screen 1019 and the display screen 1023 are integrated in the mind of the user, and a user visual field image 1027 is generated. In the user visual field image 1027, an index 1028 corresponding to the index 1001 is located at the center (center direction). On the basis of the parallax between the index 1020 and the index 1024, the user can sense the distance to the index 1028 (distance 1002). A gazing position 1029 of the user (with both eyes) can be estimated by combining the line of-sight position 1022 of the left eye and the line-of-sight position 1026 of the right eye. The gazing position 1029 does not match with the position of the index 1028. In order to suppress such a mismatch (an incorrect estimation of the gazing position), both eye calibration is required.

The description on FIG. 3A continues. In step S306, the CPU 110 performs the line-of-sight detection operation for the right eye and the line-of-sight operation for the left eye, and acquires the right line-of-sight information (line-of-sight position of the right eye), and the left line-of-sight information (line-of-sight position of the left eye).

In step S307, the CPU 110 performs the both eye calibration based on the right line-of-sight information and the left line-of-sight information acquired in step S306.

An example of the both eye calibration will be described with reference to FIGS. and 10D. If an average position of the line-of-sight position 1022 of the left eye and the line-of-sight position 1026 of the right eye is determined (estimated) as the gazing position, a position that deviated from the index 1028 is determined as the gazing position, as indicated in the gazing position 1029. However, if the line-of-sight position 1022 and the line-of-sight position 1026 are combined using appropriate weighting, a position close to the index 1028 can be determined as the gazing position. In the both eye calibration, a weight (weight information, weighting factor) for at least one of the right line-of-sight information and the left line-of-sight information, used in the case of acquiring the gazing position by combining the right line-of-sight information and the left line-of-sight information, is determined.

In step S306, it is assumed that the line-of-sight position 1022 of the left eye and the line-of-sight position 1026 of the right eye are acquired. Then it is assumed that the position of the index 1028 is the actual gazing position (predetermined gazing position) of the user. In this case, an appropriate weight Z is calculated using the following Formula 4, where the X coordinate (position in the horizontal direction) of the index 1028 is XI, the X coordinate (position in the horizontal direction) of the line-of-sight position 1022 is XL, and the X coordinate of the line-of-sight position 1026 is XR.

$$Z \times XL + (1-Z) \times XR = XI \qquad \text{(Formula 4)}$$

By using Formula 4, the right line-of-sight information and the left line-of-sight information are combined on the basis of the line-of-sight position corresponding to the right line-of-sight information and the line-of-sight information corresponding to the left line-of-sight information, and weight information to acquire a predetermined gazing position is determined. The CPU 110 stores the weight information determined based on Formula 4 in the RAM 112, so as to be associated with the index direction and the index distance. In the case of FIGS. 10C and 10D, the index position is the direction of the index 1028, and the index distance is the distance 1002.

The description on FIG. 3A continues. In Embodiment 1, a plurality of index distances (a plurality of depth position viewed from the user) are predetermined, and a plurality of index directions (a plurality of directions viewed from the user) are predetermined for each of the plurality of index distances. In step S305 described above, indexes corresponding to one of the plurality of index distances and one of the plurality of index directions are displayed.

In step S308, the CPU 110 determines whether the both eye calibration was performed for all the index directions corresponding to the current index distances. This determination may be regarded as the determination on whether all the plurality of indexes (a plurality of indexes of which index directions are different) corresponding to the current index distances were displayed. The CPU 110 advances processing to step S310 if it is determined that the both eye calibration was performed for all the index directions, or advances processing to step S309 if it is determined that there remains an index direction for which the both eye calibration was not performed.

In step S309, the CPU 110 changes (updates) the settings of the index directions. Then processing returns to step S305, and the indexes corresponding to the index directions before the update are no longer displayed, and the indexes corresponding to the updated index directions are displayed. This may be regarded as a change in the display positions of the indexes.

In step S310, the CPU 110 determines whether the both eye calibration was performed for all the index distances. This determination may be regarded as a determination on whether all the indexes (a plurality of indexes of which index distances are different, and a plurality of indexes of which index directions are different) were displayed. The CPU 110 ends the calibration operation in FIG. 3A if it is determined that the both eye calibration was performed for all the index distances, or advances processing to step S311 if it is determined that there remains an index distance for which the both eye calibration was not performed.

In step S311, the CPU 110 changes (updates) the setting of the index distance. Then processing returns to step S305, and indexes corresponding to the index distances before the update are no longer displayed, and the indexes corresponding to the updated index distances are displayed. This may be regarded as a change in the display positions of the indexes.

Figure 11:
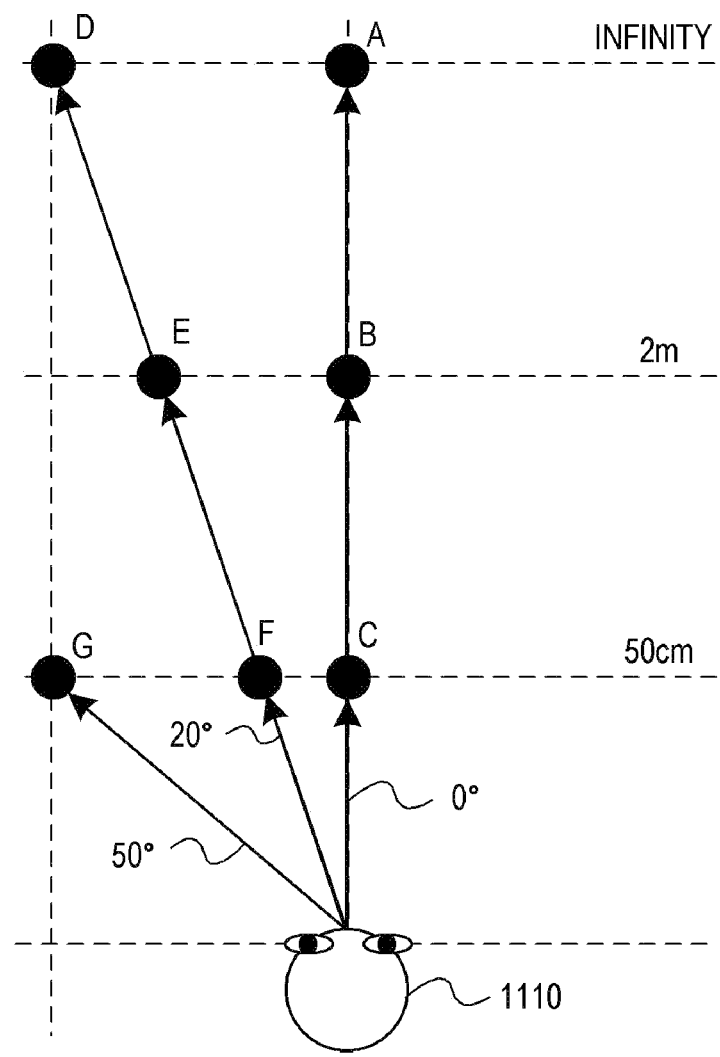
FIG. 11 is a diagram depicting an index direction and an index distance.

An example of the processing in steps S308 to S311 will be described with reference to FIG. 11. In the example of FIG. 11, three index distances (50 cm, 2 m, infinity) are predetermined on the basis of the position of the user 1110. For the 50 cm index distance, three index directions (0°, 20° and 50°) are predetermined, and three indexes (C, F and G) corresponding to the three index directions respectively are displayed. For the 2 m index distance, two index directions (0° and 20°) are predetermined, and two indexes (B and E) corresponding to the two index directions respectively are displayed. For the infinity index distance, two index directions (0° and 20°) are predetermined, and two indexes (A and D) corresponding to the two index directions respectively are displayed.

In step S309, the index direction is changed, as in 0° to 20° (to 50°), as indicated in FIG. 11. In step S311, the index distance is changed, as in 50 cm to 2 m to infinity, as indicated in FIG. 11. For example, if the index distance is 50 cm, the index direction is changed, as in 0° to 20° to 50° in step S309, and the indexes to be displayed are changed as in C to F to G. If the index distance is changed from 50 cm to 2 m in step S311, the index direction is changed as in 0° to 20° in step S309, and the index to be displayed is changed as in B to E. If the index distance is changed from 2 m to infinity in step S311, the index direction is changed as in 0° to 20° in step S309, and the index to be displayed is changed as in A to D. In the case of infinity, the index of the left display panel 107a and the index of the right display panel 107b are displayed without parallax. The index distances and the index directions indicated in FIG. 11 are examples, and a number of index distances (resolutions), a number of index directions (resolutions), and the like are not especially limited. For example, the number of index distances and the number of index directions indicated in FIG. 11 may be increased.

The calibration operation has been described, but one of the processing in steps S308 and S309 and the processing in steps S310 and S311 may be omitted. Further, only the right eye calibration and the left eye calibration are performed, and the both eye calibration may be omitted. Furthermore, only the both eye calibration may be performed, omitting the right eye calibration and the left eye calibration.

FIG. 3B is a flow chart of the gazing position estimation operation of the HMD 100. The gazing position estimation operation in FIG. 3B is performed after the calibration operation in FIG. 3A. Here it is assumed that the user is wearing the HMD 100.

In step S321, the CPU 110 performs the line-of-sight detection operation for the right eye and the line-of-sight detection operation for the left eye, and acquires the right line-of-sight information (line-of-sight position of the right eye) and the left line-of-sight information (line-of-sight position of the left eye).

In steps S322 to S324, the CPU 110 acquires the result of the both eye calibration corresponding to the right line-of-sight information and the left line-of-sight information acquired in step S321.

In step S322, the CPU 110 specifies a general range (angle-of-view) where the user is viewing, on the basis of the right line-of-sight information (line-of-sight position of the right eye) and the left line-of-sight information (line-of-sight position of the left eye) acquired in step S321. For example, a plurality of ranges based on the position of the HMD 100 (user) are predetermined, and the CPU 110 specifies (determines) a region that includes a mid-point between the detection position of the right eye and the detection position of the left eye, as the general range where the user is looking.

In step S323, the CPU 110 controls the object detection unit 113, and detects an object that exists in the range specified in step S322, controls the distance detection unit 114, and detects the distance from the HMD 100 (user) to the object (acquisition of distance information).

Figure 12:
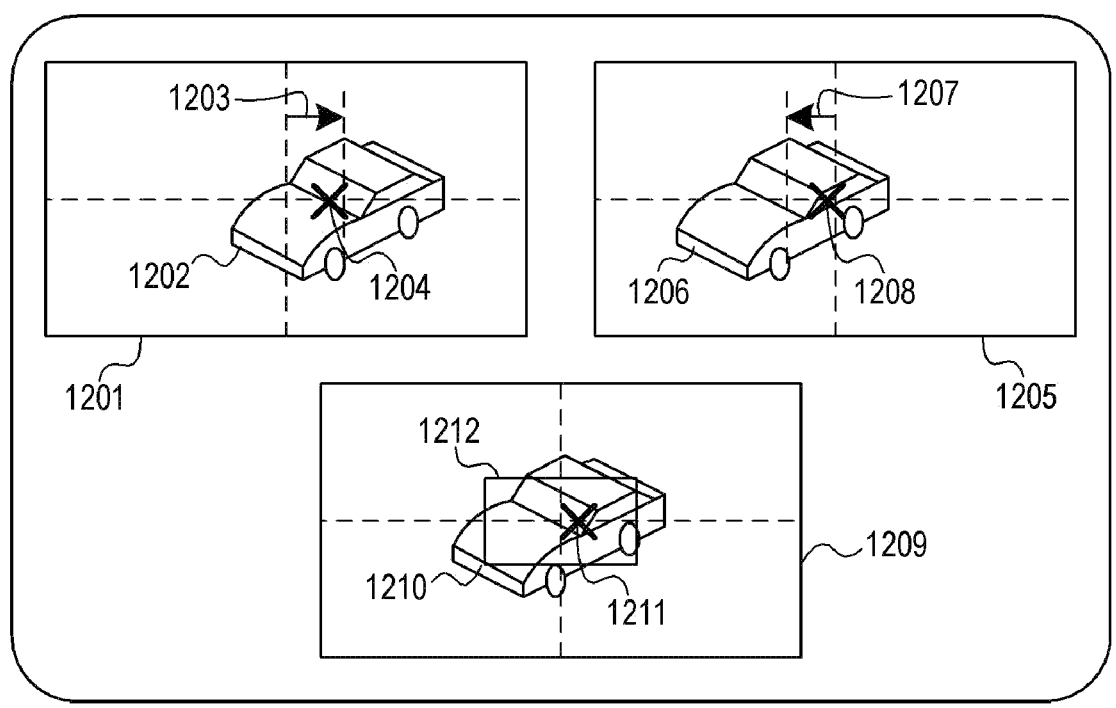
FIG. 12 is a diagram for describing a part of the gazing position estimation operation.

An example of the processing in steps S322 and S323 will be described with reference to FIG. 12. In the example of FIG. 12, a display screen 1201, including an object 1202, is displayed on the left display panel 107a, and a display screen 1205, including an object 1206, is displayed on the right display panel 107b. The object 1202 and the object 1206 correspond to a same object 1210, and are displayed with parallax. The object 1202 is displayed at a position that is distant from the center of the left display panel 107a (display screen 1201) in the right direction by a distance 1203, and the object 1206 is displayed at a position that is distant from the center of the right display panel 107b (display screen 1205) in the left direction by a distance 1207. In a user visual field range 1209, the object 1210 is located at the center (center direction). A line-of-sight position 1204 of the left eye and a line-of-sight 1208 of the right eye have been detected. The left eye line-of-sight and the right eye line-of-sight are not accurately focused on the object 1210. Hence the line-of-sight position 1204 deviates from the position of the object 1202 (position that is distant from the center of the display screen 1201 in the right direction by the distance 1203). In the same manner, the line-of-sight position 1208 deviates from the position of the object 1206 (position that is distant from the center of the display screen 1205 in the left direction by the distance 1207). In step S322, a region 1212, including a mid-point 1211 between the line-of-sight position 1204 and the line-of-sight position 1208, is specified. In step S323, the distance to the object 1210 existing in the region 1212 is detected.

Description on FIG. 3B continues. In step S324, the CPU 110 acquires the range (position in the range, index direction) specified in step S322, and the weight information (weight) corresponding to the distance (index distance) detected in step S323, as a result of the both eye calibration. For example, the CPU 110 acquires the weight information where the combination of the index direction and the index distance is closest to the combination of the direction of the range specified in step S322 and the distance detected in step S323.

In step S325, the CPU 110 estimates the gazing position of the user based on the right line-of-sight information (line-of-sight position of the right eye) acquired in step S321, the left line-of-sight information (line-of-sight position of the left eye) acquired in step S321, and the weight information acquired in step S324. For example, the CPU 110 calculates the X coordinate XT of the gazing position from the X coordinate XR of the line-of-sight position of the right eye, the X coordinate XL of the left eye, and the weight Z, using the following Formula 5. The CPU 110 may estimate (determine) an average position between the Y coordinate (coordinate in the vertical direction) of the line-of-sight position of the right eye and the Y coordinate of the line-of-sight position of the left eye as the Y coordinate of the gazing position, or may estimate the Y coordinate using the same method as the method of estimating the X coordinate XT. Furthermore, the CPU 110 may estimate the Y coordinate of the line-of-sight position of the right eye or the Y coordinate of the line-of-sight position of the left eye as the Y coordinate of the gazing position.

$$XT=Z \times XL+(1-Z) \times XR \quad \text{(Formula 5)}$$

As described above, according to Embodiment 1, calibration on the line-of-sight detection is performed, whereby high precision information (accurate information) can be acquired as information on the line-of-sight of the right eye and the left eye of the user. For example, the line-of-sight position of the right eye, the line-of-sight position of the left eye and the gazing position with both eyes can be accurately estimated by performing right eye calibration, the left eye calibration and the both eye calibration.

In the example described above, the left display panel 107a is turned OFF when the right eye calibration is performed, and the right display panel 107b is turned OFF when the left eye calibration is performed, but the present invention is not limited thereto. For example, the CPU 110 may control to instruct the user to close the left eye when the right eye calibration is performed, and to instruct the user to close the right eye when the left eye calibration is performed. The instruction to the user is performed via voice, screen display or the like. Here, however, the degree of opening of the right eye changes if the left eye is closed, and the degree of opening of the left eye changes if the right eye is closed, hence it is preferable to perform the right eye calibration and the left eye calibration in the same state where the normal state of the HMD 100 is used (e.g. state where both eyes are open).

Embodiment 2

Embodiment 2 of the present invention will be described. Description on the aspects (configuration and processing) that are the same as Embodiment 1 will be omitted unless otherwise necessary.

The line-of-sight position fluctuates due to the unintended eyeball motion (e.g. involuntary eye movement) of the user. The fluctuation range of the line-of-sight position corresponding to the unintended eyeball motion may be different between the dominant eye and the non-dominant eye, and the estimation accuracy of the gazing position drops due to such a difference. In Embodiment 2, this drop in estimation accuracy is suppressed.

Figure 13B:
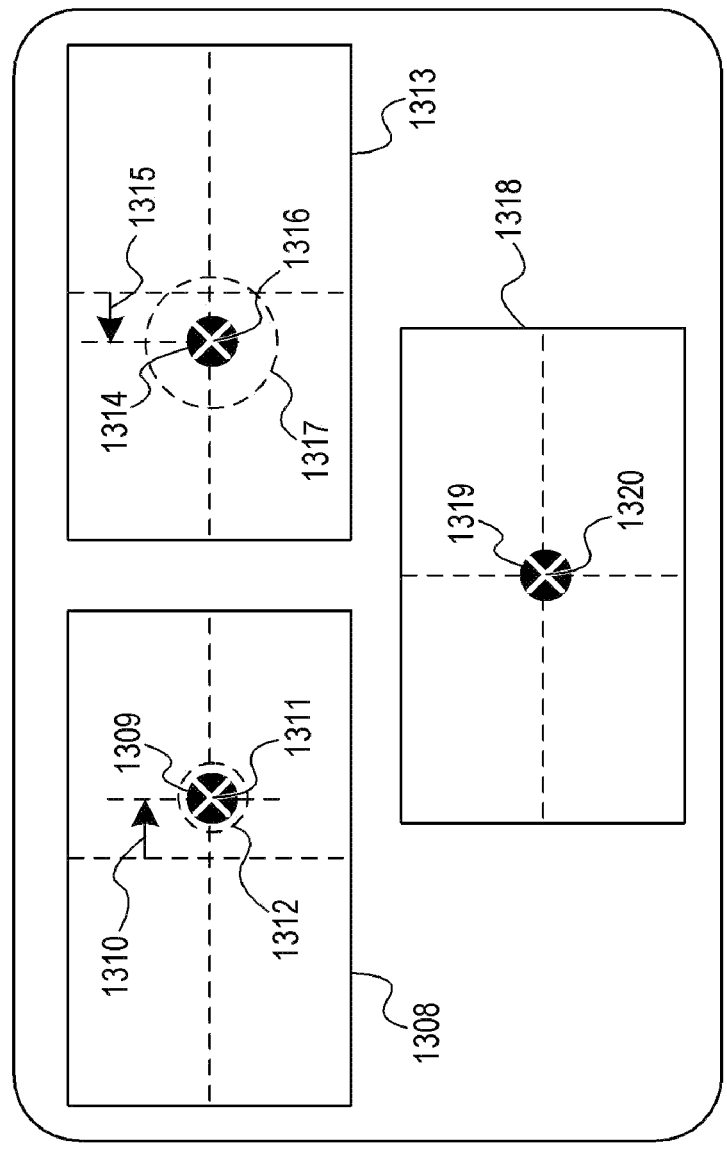
FIGS. 13A and 13B are diagrams for describing a problem to be solved in Embodiment 2.
Figure 13A:
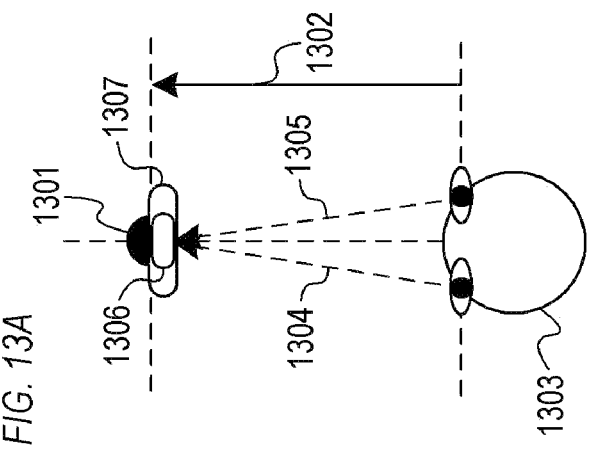

FIG. 13A is a schematic diagram depicting a relationship between an index 1301 and a user 1303. The index 1301 exists at a position that is distant from the user 1303 by a distance 1302. In FIG. 13A, a left eye line-of-sight 1304 and a right eye line-of-sight 1305 are focused on the index 1301, but the left eye line-of-sight 1304 fluctuates in a fluctuation range 1306, and the right eye line-of-sight 1305 fluctuates in a fluctuation range 1307, which is wider than the fluctuation range 1306. Each center of the fluctuation ranges 1306 and 1307 matches with the index 1301.

FIG. 13B indicates display screens and line-of-sight positions (estimated positions, line-of-sight detection result) in the state in FIG. 13A. A display screen 1308, including an index 1309 corresponding to the index 1301, is displayed on the left display panel 107a, and a display screen 1313, including an index 1314 corresponding to the index 1301, is displayed on the right display panel 107b. The index 1309 and the index 1314 are displayed with parallax corresponding to the distance 1302. The index 1309 is displayed at a position that is distant from the center of the left display panel 107a (display screen 1308) in the right direction by a distance 1310, and the index 1314 is displayed at a position that is distant from the center of the right display panel 107b (display screen 1313) in the left direction by a distance 1315. The left eye calibration has been performed, hence a line-of-sight position 1311 of the left eye has been accurately estimated. The line-of-sight position 1311 indicated here matches with the position of the index 1309, but actually fluctuates in a fluctuation range 1312. The center of the fluctuation range 1312 matches with the index 1309. In the same manner, the right eye calibration has been performed, hence a line-of-sight position 1316 of the right eye has been accurately estimated. The line-of-sight position 1316 indicated here matches with the position of the index 1314, but actually fluctuates in a fluctuation range 1317, which is wider than the fluctuation range 1312. The center of the fluctuation range 1317 matches with the index 1314.

The display screen 1308 and the display screen 1313 are integrated in the mind of the user, and a user visual field image 1318 is generated. In the user visual field image 1318, an index 1319 corresponding to the index 1301 is located at the center (center direction). On the basis of the parallax between the index 1309 and the index 1314, the user can sense a distance to the index 1319 (distance 1302). In Embodiment 2, a drop in the estimation accuracy of the gazing position due to the difference between the fluctuation range 1312 and the fluctuation range 1317 is suppressed, so as to estimate a gazing position 1320 which matches with the position of the index 1319.

Figure 14:
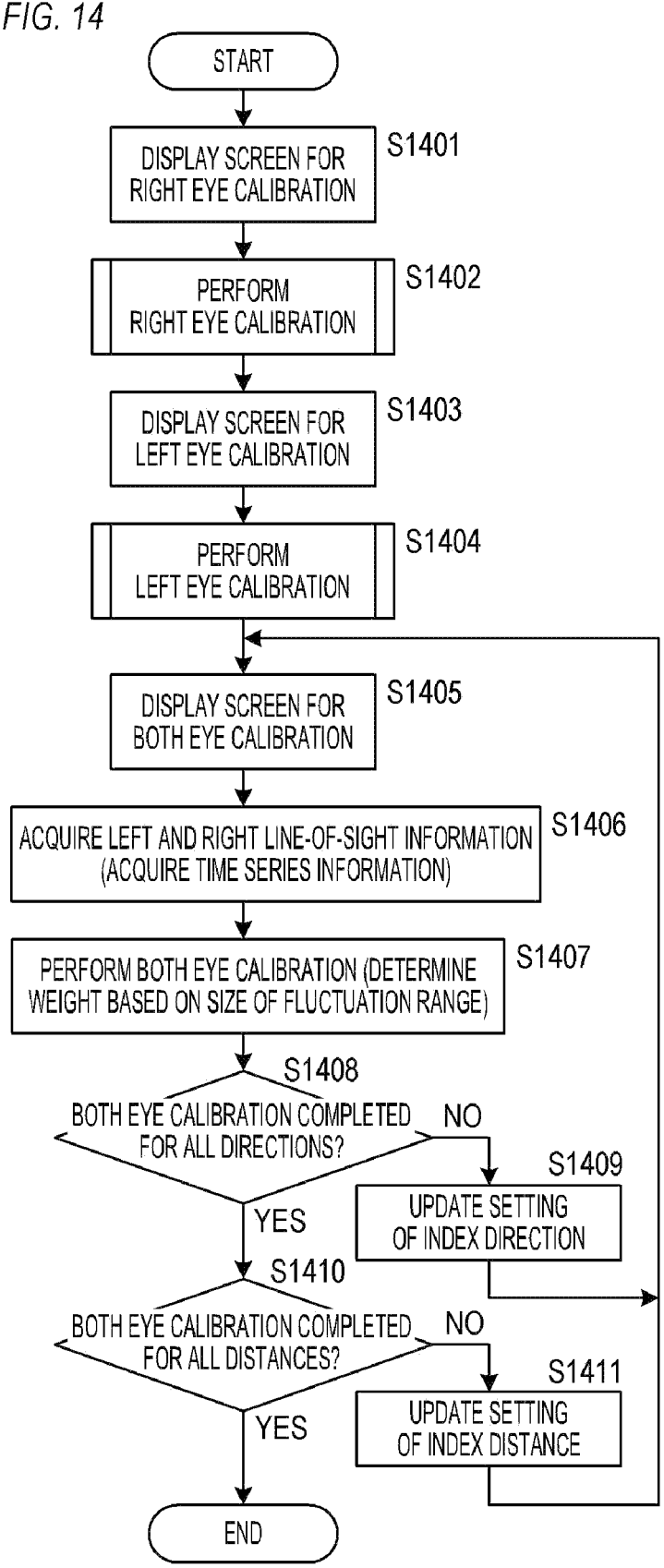
FIG. 14 is a flow chart of a calibration operation according to Embodiment 2.

FIG. 14 is a flow chart of the calibration operation according to Embodiment 2. Steps S1401 to S1405 are the same as steps S301 to S305 in FIG. 3A, and steps S1408 to S1411 are the same as steps S308 to S311 in FIG. 3A.

In step S1406, the CPU 110 performs the line-of-sight detection operation for the right eye and the line-of-sight detection operation for the left eye for a predetermined time, and acquires time series information (time series data) that indicates time-based changes of the right line-of-sight information (line-of-sight position of the right eye) and the left line-of-sight information (line-of-sight position of the left eye).

In step S1407, the CPU 110 performs the both eye calibration based on the time series information acquired in step S1406. For example, the CPU 110 specifies a right fluctuation range (fluctuation range of the line-of-sight position of the right eye) based on the time-based changes of the right line-of-sight information; and specifies a left fluctuation range (fluctuation range of the line-of-sight position of the left eye) based on the time-based changes of the left line-of-sight information. Then the CPU 110 assumes that a reciprocal number of the size of the fluctuation range is a reliability of the line-of-sight position, and determines a weight based on the size of the right fluctuation range and the size of the left fluctuation range. For example, the CPU 110 can calculate a weight Z of the line-of-sight position of the left eye based on a reciprocal number α of the size of the left fluctuation range, and a reciprocal number β of the size of the right fluctuation range, using the following Formula 6. The size of a fluctuation range is a number of pixels in the fluctuation range, for example.

$$Z=\alpha/(\alpha+\beta) \quad \text{(Formula 6)}$$

As described above, according to Embodiment 2, the weight (weight information) is determined on the basis of the size of the right fluctuation range and the size of the left fluctuation range. Thereby the drop in estimation accuracy of the gazing position due to the difference between the right fluctuation range and the left fluctuation range can be reduced.

Embodiment 3

Embodiment 3 of the present invention will be described. In Embodiment 3, Embodiment 1 and Embodiment 2 are combined. Description on the aspects (configuration and processing) that are the same as Embodiment 1 and Embodiment 2 will be omitted unless otherwise necessary.

Figure 15B:
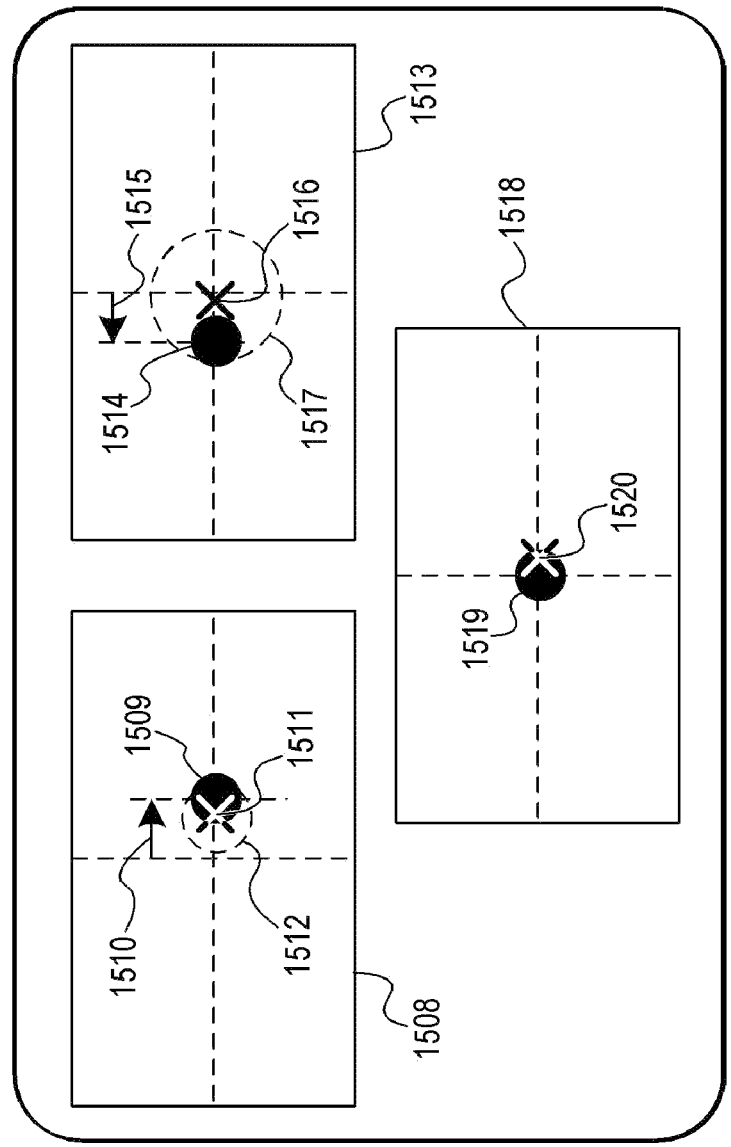
FIGS. 15A and 15B are diagrams for describing a problem to be solved in Embodiment 3.
Figure 15A:
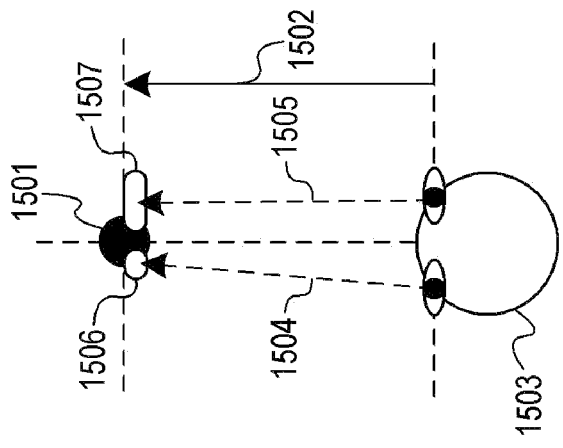

FIG. 15A is a schematic diagram depicting a relationship between an index 1501 and a user 1503. The index 1501 exists at a position that is distant from the user 1503 by a distance 1502. A left eye line-of-sight 1504 (a line-of-sight passing through the center of a fluctuation range 1506) and a right eye line-of-sight 1505 (a line-of-sight passing through the center of a fluctuation range 1507) are not focused on the index 1501. Here it is assumed that a dominant eye of the user 1503 is a left eye. Therefore the left eye line-of-sight 1504 faces the direction closer to the index 1501 than the right eye line-of-sight 1505. The left eye line-of-sight 1504 fluctuates in the fluctuation range 1506, and the right eye line-of-sight 1505 fluctuates in a fluctuation range 1507, which is wider than the fluctuation range 1506.

FIG. 15B indicates display screens and line-of-sight positions (estimated positions, line-of-sight detection result) in the state in FIG. 15A. A display screen 1508, including an index 1509 corresponding to the index 1501, is displayed on the left display panel 107a, and a display screen 1513, including an index 1514 corresponding to the index 1501, is displayed on the right display panel 107b. The index 1509 and the index 1514 are displayed with parallax corresponding to the distance 1502. The index 1509 is displayed at a position that is distant from the center of the left display panel 107a (display screen 1508) in the right direction by a distance 1510, and the index 1514 is displayed at a position that is distant from the center of the right display panel 107b (display screen 1513) in the left direction by a distance 1515. The left eye calibration has been performed, hence a line-of-sight position 1511 of the left eye (center of a fluctuation range 1512) has been accurately estimated as the line-of-sight position of one eye. However, as indicated in FIG. 15A, the left eye line-of-sight 1504 is not focused on the index 1501, hence the line-of-sight position 1511 deviates from the position of the index 1509. In the same manner, the right eye calibration has been performed, hence a line-of-sight position 1516 of the right eye (center of a fluctuation range 1517) has been accurately estimated as the line-of-sight position of one eye. However, as indicated in FIG. 15A, the right eye line-of-sight 1505 is not focused on the index 1501, hence the line-of-sight position 1516 deviates from the position of the index 1514. Here a dominant eye is the left eye, therefore the deviation amount (distance) between the line-of-sight position 1511 of the left eye and the position of the index 1509 is smaller than the deviation amount between the line-of-sight position 1516 of the right eye and the position of the index 1514. The line-of-sight position 1511 of the left eye fluctuates in the fluctuation range 1512, and the line-of-sight position 1516 of the right eye fluctuates in the fluctuation range 1517, which is wider than the fluctuation range 1512.

The display screen 1508 and the display screen 1513 are integrated in the mind of the user, and a user visual field image 1518 is generated. In the user visual field image 1518, an index 1519 corresponding to the index 1501 is located at the center (center direction). On the basis of the parallax between the index 1509 and the index 1514, the user can sense the distance to the index 1519 (distance 1502). Just like Embodiment 1 (FIG. 10D), a gazing position 1520, generated by combining the line-of-sight position 1511 of the left eye and the line-of-sight position 1516 of the right eye, does not match with the position of the index 1519. In Embodiment 3, this mismatch (an incorrect estimation of the gazing position) is suppressed. Further, just like Embodiment 2, a drop in the estimation accuracy of the gazing position, due to the difference between the fluctuation range 1512 and the fluctuation range 1517, is suppressed.

FIG. 16A is a flow chart of the calibration operation according to Embodiment 3. Steps S1601 to S1605 are the same as steps S301 to S305 in FIG. 3A, step S1606 is the same as step S1406 in FIG. 14, and steps S1608 to S1611 are the same as steps S308 to S311 in FIG. 3A.

In step S1607, the CPU 110 performs the both eye calibration based on the time series information acquired in step S1606. For example, the CPU 110 specifies a right fluctuation range (fluctuation range of the line-of-sight position of the right eye) based on the time-based changes of the right line-of-sight information, and specifies a left fluctuation range (fluctuation range of the line-of-sight position of the left eye) based on the time-based changes of the left line-of-sight information. Then, using the following Formula 7, the CPU 110 calculates a weight Z of the line-of-sight position of the left eye based on the X coordinates XI of the index, the X coordinate XL' of the position of the left fluctuation range, and the X coordinate XR' of the position of the right fluctuation range. The position of a fluctuation range is a center of gravity position of the fluctuation range, for example. The position of the fluctuation range may be specified on the basis of the time-based changes of the line-of-sight position by filter processing using a predetermined cut-off frequency, or the like.

$$Z \times XL' + (1-Z) \times XR' = XI \tag{Formula 7}$$

FIG. 16B is a flow chart of the gazing position estimation operation according to Embodiment 3. In step S1621, the CPU 110 performs the line-of-sight detection operation for the right eye and the line-of-sight detection operation for the left eye for a predetermined time, and acquires the time series information (time series data) which indicates the time-based changes of the right line-of-sight information (line-of-sight position of the right eye) and the left line-of-sight information (line-of-sight position of the left eye). Then the CPU 110 specifies the position of the right fluctuation range (fluctuation range of the line-of-sight position of the right eye) based on the time-based changes of the right line-of-sight information, and specifies the position of the left fluctuation range (fluctuation range of the line-of-sight position of the left eye) based on the time-based changes of the left line of sight information. Steps S1622 to S1625 are the same as steps S322 to S325 of FIG. 3B, except that the "line-of-sight position" in FIG. 3B is interpolated as the "position of the fluctuation range" in FIG. 16B.

As described above, in Embodiment 3, Embodiments 1 and 2 are combined, whereby the gazing position can be estimated more accurately than Embodiments 1 and 2.

The above mentioned embodiments (including modification) are merely examples, and the present invention includes configurations acquired by appropriately modifying or changing the above configurations within the scope of the spirit of the invention. The present invention also includes configurations acquired by appropriately combining the above configurations.

According to the preset invention, highly precise information (accurate information) can be acquired as information on the line-of-sight of the right eye and the left eye of the user.

Other Embodiments

Embodiment(s) of the present invention can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2022-092010, filed on Jun. 7, 2022, which is hereby incorporated by reference herein in its entirety.

What is claimed is:

1. An electronic apparatus comprising at least one memory and at least one processor which function as:
   a first acquisition unit configured to acquire right line-of-sight information on a line-of-sight of a right eye of a user;
   a second acquisition unit configured to acquire left line-of-sight information on a line-of-sight of a left eye of the user; and
   a control unit configured to control the electronic apparatus such that right eye calibration is performed on a basis of right line-of-sight information which is acquired by the first acquisition unit at a first timing, and left eye calibration is performed on a basis of left line-of-sight information which is acquired by the second acquisition unit at a second timing which is different from the first timing, wherein
   the control unit further controls the electronic apparatus such that a simultaneous both eye calibration is performed on a basis of the right line-of-sight information acquired by the first acquisition unit and the left line-of-sight information acquired by the second acquisition unit.

2. The electronic apparatus according to claim 1, wherein
   in a state where the user is wearing a head mounted display,
      a first display of the head mounted display faces the right eye of the user, and
      a second display of the head mounted display faces the left eye of the user,
   the first acquisition unit acquires the right line-of-sight information of the user viewing the first display in a state where the user is wearing the head mounted display,
   the second acquisition unit acquires the left line-of-sight information of the user viewing the second display in a state where the user is wearing the head mounted display, and
   the control unit
      controls the electronic apparatus such that the second display is turned OFF and a first index is displayed on the first display in a case of the right eye calibration, and
      controls the electronic apparatus such that the first display is turned OFF and a second index is displayed on the second display in a case of the left eye calibration.

3. The electronic apparatus according to claim 1, wherein
   the control unit
      controls the electronic apparatus to instruct the user to close the left eye in a case of the right eye calibration, and
      controls the electronic apparatus to instruct the user to close the right eye in a case of the left eye calibration.

4. The electronic apparatus according to claim 1, wherein
   the control unit controls the electronic apparatus such that the simultaneous both eye calibration is performed on a basis of the right line-of-sight information acquired by the first acquisition unit at a third timing which is after the first timing and the second timing and the left line-of-sight information acquired by the second acquisition unit at the third timing.

5. The electronic apparatus according to claim 4, wherein
   the first timing is a timing at which a first index is displayed,
   the second timing is a timing at which a second index is displayed, and
   the third timing is a timing at which a third index is displayed.

6. The electronic apparatus according to claim 1, wherein
   in a state where the user is wearing a head mounted display,
      a first display of the head mounted display faces the right eye of the user, and
      a second display of the head mounted display faces the left eye of the user,
   the first acquisition unit acquires the right line-of-sight information of the user viewing the first display in a state where the user is wearing the head mounted display,
   the second acquisition unit acquires the left line-of-sight information of the user viewing the second display in a state where the user is wearing the head mounted display, and
   the control unit controls the electronic apparatus to display an index on each of the first display and the second display in a case of the simultaneous both eye calibration.

7. The electronic apparatus according to claim 6, wherein
   the control unit controls the electronic apparatus to display a plurality of indexes, of which depth positions viewed from the user are different, on each of the first display and the second display in a case of the simultaneous both eye calibration.

8. The electronic apparatus according to claim 6, wherein
   the control unit controls the electronic apparatus to display a plurality of indexes, of which directions viewed from the user are different, on each of the first display and the second display in a case of the simultaneous both eye calibration.

9. The electronic apparatus according to claim 1, wherein in the simultaneous both eye calibration, weight information on at least one of the right line-of-sight information and the left line-of-sight information is determined, the weight information being used for acquiring a gazing position of the user by combining the right line-of-sight information acquired by the first acquisition unit and the left line-of-sight information acquired by the second acquisition unit.

10. The electronic apparatus according to claim 9, wherein
in the simultaneous both eye calibration, the weight information, for acquiring a predetermined gazing position by combining the right line-of-sight information and the left line-of-sight information, is determined on a basis of a line-of-sight position corresponding to the right line-of-sight information acquired by the first acquisition unit and a line-of-sight position corresponding to the left line-of-sight information acquired by the second acquisition unit.

11. The electronic apparatus according to claim 9, wherein
in the simultaneous both eye calibration, the weight information is determined on a basis of a size of a fluctuation range of a line-of-sight position corresponding to the right line-of-sight information acquired by the first acquisition unit and a size of a fluctuation range of a line-of-sight position corresponding to the left line-of-sight information acquired by the second acquisition unit.

12. The electronic apparatus according to claim 9, wherein
in the simultaneous both eye calibration, the weight information is determined on a basis of a position of a fluctuation range of a line-of-sight position corresponding to the right line-of-sight information acquired by the first acquisition unit and a position of a fluctuation range of a line-of-sight position corresponding to the left line-of-sight information acquired by the second acquisition unit.

13. The electronic apparatus according to claim 1, wherein
the at least one memory and the at least one processor further function as:
a third acquisition unit configured to acquire a result of the simultaneous both eye calibration corresponding to the right line-of-sight information acquired by the first acquisition unit and the left line-of-sight information acquired by the second acquisition unit; and
an estimation unit configured to estimate a gazing position of the user, on a basis of the right line-of-sight information acquired by the first acquisition unit, the left line-of-sight information acquired by the second acquisition unit, and the result of the simultaneous both eye calibration acquired by the third acquisition unit.

14. The electronic apparatus according to claim 13, wherein
the at least one memory and the at least one processor further function as a fourth acquisition unit configured to acquire distance information from the user to an object that exists in a range based on the right line-of-sight information acquired by the first acquisition unit and the left line-of-sight information acquired by the second acquisition unit, wherein
the third acquisition unit acquires information corresponding to the range and the distance information as the result of the simultaneous both eye calibration.

15. The electronic apparatus according to claim 13, wherein
the estimation unit estimates a gazing position of the user on a basis of a position of a fluctuation range of a line-of-sight position corresponding to the right line-of-sight information acquired by the first acquisition unit, a position of a fluctuation range of a line-of-sight position corresponding to the left line-of-sight information acquired by the second acquisition unit, and a result of the simultaneous both eye calibration acquired by the third acquisition unit.

16. The electronic apparatus according to claim 1, wherein
the right eye calibration is performed for improving accuracy of the right line-of-sight information to be acquired,
the left eye calibration is performed for improving accuracy of the left line-of-sight information to be acquired, and
the simultaneous both eye calibration is performed for improving estimation accuracy of a gazing position of the user.

17. A control method of an electronic apparatus, comprising:
acquiring right line-of-sight information on a line-of-sight of a right eye of a user at a first timing;
acquiring left line-of-sight information on a line-of-sight of a left eye of the user at a second timing;
controlling the electronic apparatus such that right eye calibration is performed on a basis of the acquired right line-of-sight information, and left eye calibration is performed on a basis of the acquired left line-of-sight information; and
controlling the electronic apparatus such that a simultaneous both eye calibration is performed on a basis of the acquired right line-of-sight information and the acquired left line-of-sight information.

18. A non-transitory computer readable medium that stores a program, wherein the program causes a computer to execute the control method according to claim 17.

* * * * *